(12) United States Patent
Parks

(10) Patent No.: US 7,857,254 B2
(45) Date of Patent: Dec. 28, 2010

(54) SYSTEM AND METHOD FOR UTILIZING STORED ELECTRICAL ENERGY FOR VTOL AIRCRAFT THRUST ENHANCEMENT AND ATTITUDE CONTROL

(75) Inventor: Robert Parks, San Jose, CA (US)

(73) Assignee: Aurora Flight Sciences Corporation, Manassaa, VA (US)

( * ) Notice: Subject to any disclaimer, the term of this patent is extended or adjusted under 35 U.S.C. 154(b) by 124 days.

(21) Appl. No.: 11/313,997

(22) Filed: Dec. 22, 2005

(65) Prior Publication Data

US 2007/0057113 A1   Mar. 15, 2007

Related U.S. Application Data

(60) Provisional application No. 60/637,760, filed on Dec. 22, 2004.

(51) Int. Cl.
  *B64C 15/12*   (2006.01)
(52) U.S. Cl. .................. 244/12.4; 244/12.5; 244/56
(58) Field of Classification Search ............ 244/12.1, 244/12.3, 12.4, 53 R, 54–56
  See application file for complete search history.

(56) References Cited

U.S. PATENT DOCUMENTS

| | | | | |
|---|---|---|---|---|
| 2,023,334 | A | * | 12/1935 | Marmonier .................. 244/13 |
| 3,038,683 | A | * | 6/1962 | Rowe ......................... 244/12.4 |
| 3,120,362 | A | * | 2/1964 | Curtis et al. ................... 244/52 |
| 3,139,244 | A | * | 6/1964 | Bright ........................ 244/12.3 |
| 3,157,373 | A | * | 11/1964 | May et al. ................. 244/23 B |
| 3,278,138 | A | * | 10/1966 | Haberkorn ................. 244/12.3 |
| 3,388,878 | A | * | 6/1968 | Peterson et. al. ........... 244/23 B |
| 3,460,783 | A | * | 8/1969 | Haberkorn .................... 244/56 |
| 3,937,238 | A | | 2/1976 | Stewart et al. |
| 4,125,232 | A | | 11/1978 | MacLean et al. |
| 4,222,234 | A | | 9/1980 | Adamson |
| 4,469,294 | A | | 9/1984 | Clifton |
| 4,789,115 | A | | 12/1988 | Koutsoupidis |
| 4,828,203 | A | | 5/1989 | Clifton et al. |
| 4,901,947 | A | | 2/1990 | Raymer |
| 5,000,399 | A | | 3/1991 | Readnour et al. |
| 5,131,605 | A | | 7/1992 | Kress |
| 5,141,176 | A | * | 8/1992 | Kress et al. .................. 244/7 C |

(Continued)

OTHER PUBLICATIONS

Aerospace Projects Review eV1N5; Dennis Jenkins, et al.; May 1, 2008; 90 Pages; "Lockheed CL-407"; Bill Slayton; pp. 7-14.

(Continued)

*Primary Examiner*—Rob Swiatek
*Assistant Examiner*—Philip J Bonzell
(74) *Attorney, Agent, or Firm*—Katten Muchin Rosenman LLP

(57) ABSTRACT

A system and method are provided for a short take-off and landing/vertical take-off and landing aircraft that stores required take-off power in the form of primarily an electric fan engine, and secondarily in the form of an internal combustion engine, wherein the combined power of the electric fan and internal combustion engines can cause the STOL/VTOL A/C to take-off in substantially less amount of time and space than other STOL/VTOL A/C, and further wherein the transition from vertical to horizontal thrust is carefully executed to rapidly rise from the take-off position to a forward flight position, thereby minimizing the necessity for a larger electric fan engine.

34 Claims, 40 Drawing Sheets

U.S. PATENT DOCUMENTS

| | | | |
|---|---|---|---|
| 5,170,963 A | 12/1992 | Beck, Jr. | |
| 5,178,344 A | 1/1993 | Dlouhy | |
| 5,312,069 A * | 5/1994 | Bollinger et al. | 244/12.3 |
| 5,351,911 A | 10/1994 | Neumayr | |
| 5,407,150 A | 4/1995 | Sadleir | |
| 5,421,538 A | 6/1995 | Vassa | |
| 5,550,455 A * | 8/1996 | Baker | 322/23 |
| 5,823,468 A | 10/1998 | Bothe | |
| 5,890,441 A | 4/1999 | Swinson et al. | |
| 6,340,133 B1 | 1/2002 | Capanna | |
| 6,464,166 B1 | 10/2002 | Yoeli | |
| 6,547,180 B1 | 4/2003 | Cassidy | |
| 6,561,455 B2 | 5/2003 | Capanna | |
| 6,629,670 B1 | 10/2003 | Shah | |
| 6,711,477 B1 | 3/2004 | Johnson et al. | |
| 6,808,140 B2 | 10/2004 | Moller | |
| 6,817,570 B2 * | 11/2004 | Yoeli | 244/12.1 |
| 6,860,449 B1 | 3/2005 | Chen | |
| 6,886,776 B2 * | 5/2005 | Wagner et al. | 244/12.4 |
| 6,892,980 B2 | 5/2005 | Kawai | |
| 2003/0006339 A1 | 1/2003 | Capanna | |
| 2003/0038213 A1 | 2/2003 | Yoeli | |
| 2003/0062443 A1 | 4/2003 | Wagner | |
| 2003/0080242 A1 | 5/2003 | Kawai | |
| 2003/0094537 A1 | 5/2003 | Austen-Brown | |
| 2004/0025490 A1 | 2/2004 | Paul | |
| 2004/0044444 A1 | 3/2004 | Johnson et al. | |
| 2004/0094662 A1 | 5/2004 | Sanders, Jr. et al. | |
| 2004/0149857 A1 | 8/2004 | Yoeli | |
| 2004/0164204 A1 | 8/2004 | Lair | |
| 2004/0245374 A1 | 12/2004 | Morgan | |
| 2005/0022866 A1 | 2/2005 | Sakurai et al. | |

OTHER PUBLICATIONS

Executive Summary for Sonic Blue Aerospace, Inc., Sonic Blue Aerospace, Inc., © 2004; 2 pp.

The V/STOL Wheel of Mis-Fortune;http://vstol.org/wheel/; Jun. 23, 2006.

International Search Report and Written Opinion, mailed Jul. 14, 2006, in co-pending PCT Application No. PCT/US05/46755; Jul. 14, 2006; 5 pages.

International Search Report and Written Opinion issued Dec. 19, 2006 in co-pending PCT Application No. PCT/US05/46728.

* cited by examiner

100b

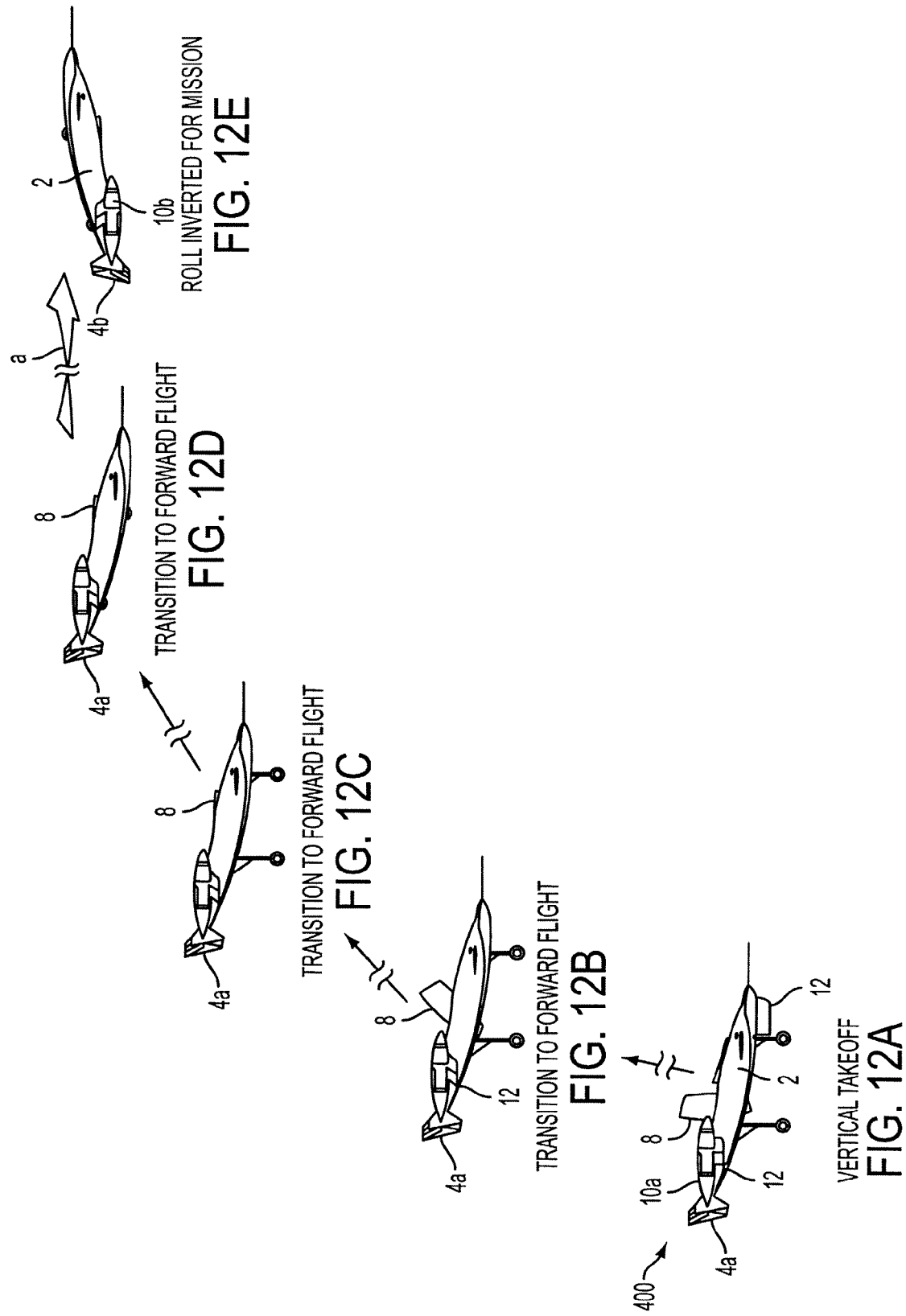

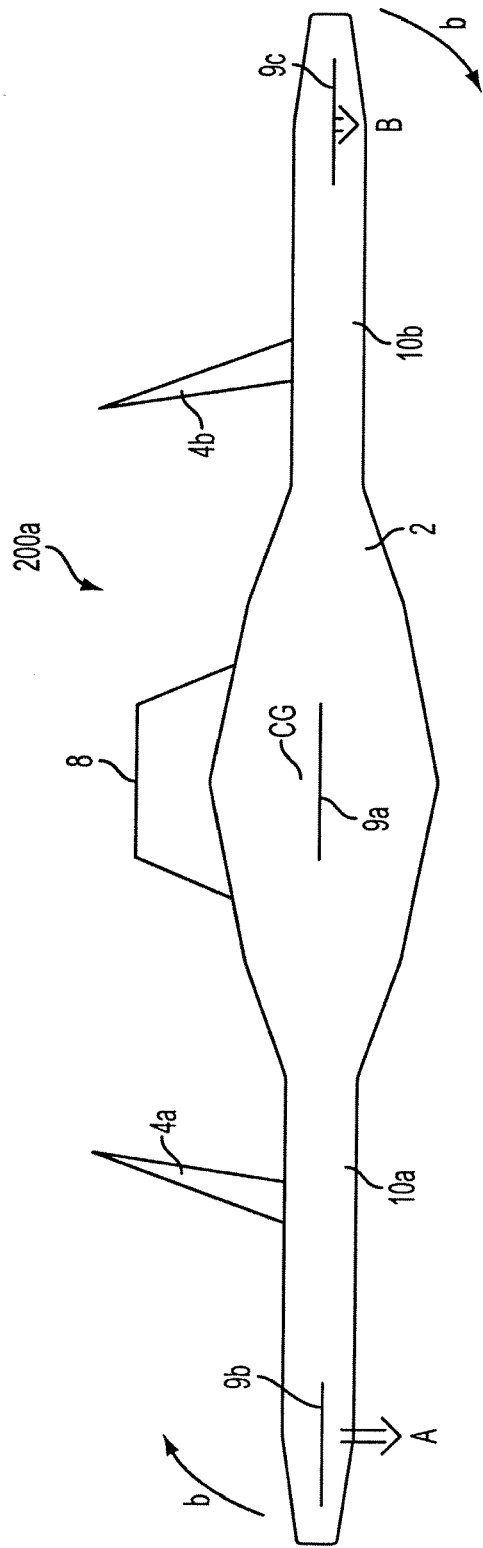
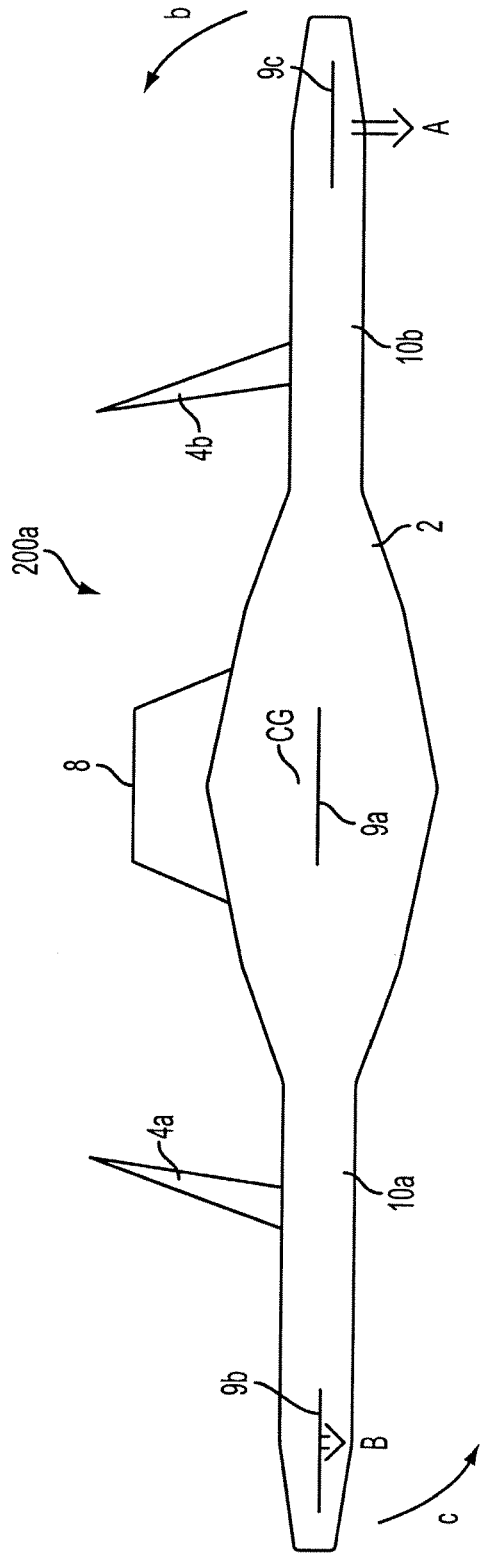
FIG. 15A
FIG. 15B

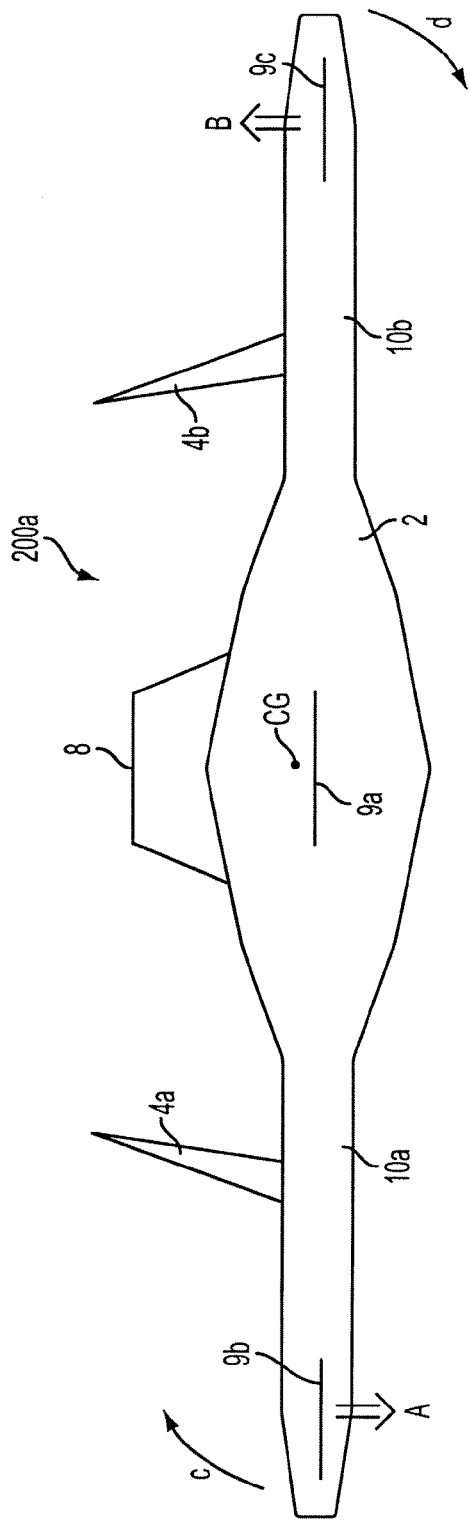
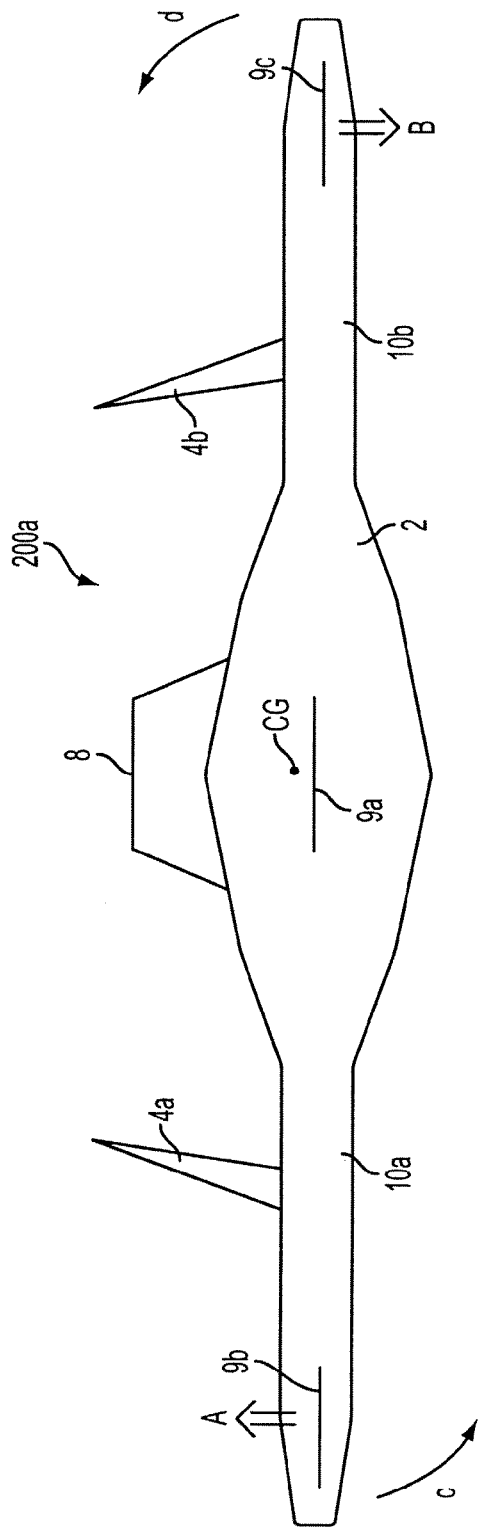
FIG. 17A
FIG. 17B

SYSTEM AND METHOD FOR UTILIZING STORED ELECTRICAL ENERGY FOR VTOL AIRCRAFT THRUST ENHANCEMENT AND ATTITUDE CONTROL

DOMESTIC PRIORITY

The present application claims priority under 35 U.S.C. §119(e) to U.S. Provisional Patent Application Ser. No. 60/637,670, filed Dec. 22, 2004, the entire contents of which are expressly incorporated herein by reference.

BACKGROUND OF THE INVENTION

1. Field of the Invention

The invention relates to short take-off and landing aircraft and vertical takeoff and landing aircraft (STOL/VTOL A/C). More particularly, the invention relates to a system and method for combining and transferring power between an electric fan engine and an internal combustion engine to maximize take-off, horizontal and hovering flight performance.

2. Description of the Related Art

FIGS. 1A-1C illustrate perspective views of several typical aircraft with tilt engine capabilities. The use of tilt engines in aircraft is well known to those of ordinary skill in the art. The principle benefit of a tilt engine is a shortened or vertical take-off capability. Vectoring the thrust allows the aircraft provide a vertical component of thrust instead of, or complementary to, "conventional" horizontal thrust. Horizontal thrust pushes the aircraft forward, thereby moving air over the lifting surfaces of the aircraft, generating lift according to the well known principles of Bernoulli, and flight is thus achieved.

Aircraft with engines that can tilt seek to shorten their take-off distance, or eliminate it completely, by vectoring the thrust from the engine to a substantially total or partially vertical orientation. Vertical thrust, as in a rocket or helicopter, lifts the aircraft straight up, or shortens the take-off distance considerably. Following take-off, the tilt engine aircraft typically rotates the engines to a substantially horizontal position to push the aircraft forward, thereby moving air over the wings, as discussed above. The transition from vertical to horizontal flight must be done carefully, especially in non-rotating wing aircraft, because too fast a transition will leave the aircraft with an insufficient amount of air moving over the wings, and no lift will be generated, and the aircraft will fall, like a rock.

Another problem that all the aircraft shown in FIGS. 1A-1C exhibit is that of high observability. Observability is defined as the ability for the aircraft to be "observed" or detected by detection equipment. The detection equipment in this case refers to radar, which detects objects using the radio portion of the electromagnetic spectrum, and infra-red detectors, which uses the infra-red (IR) portion of the electromagnetic spectrum to detect objects. Generally, the larger an object is, the easier it will be to detect using radar. Detectability by radar can be lessened by designing the object to deflect electromagnetic energy in different directions (i.e., not back towards the radar receiver), use of non-reflective or low-reflective materials, or making the object smaller.

Infra-red detectors detect the object by the heat that the object emits. All objects emit heat (otherwise known as "blackbody radiation"). The heat generated by a body shows up in the infra-red portion of the electromagnetic portion. The main source of heat in an aircraft are the engines, and they are usually good heat generators. Turbo jet engines operate at very high temperatures (from about 1000° F. to as much as 2700° F.). Of course, the high temperature portions of the engines are covered with other components, which helps to hide the heat, and the cold atmosphere assists in reducing the heat of the engine, but, the engines still create enough heat to be highly observable to infra-red detectors.

The aircraft illustrated in FIGS. 1A-1C are highly detectable in both a radar sense and an infra red sense. The opposite of a high detectability is low detectability, and an aircraft that has low detectability can also be said to have low-observability, or "LO". An aircraft that has LO is also said to be "stealthy". The aircraft of FIGS. 1A-1C are not stealthy from a radar perspective, because their engines have a large radar cross section (RCS) that adds to the RCS of the main fuselage of the aircraft. Radar cross section is a factor that relates the amount of power of the radio waves that an object reflects or scatters back in the direction of the radar to the power density of the radar's transmitted waves at the object's range. The radar cross section is dependent on the cross sectional area of an object as seen by the radar, the object's reflectivity and its directivity. The cross sectional area, of course, is directly related to the size of the object. The aircraft of FIGS. 1A-1C also suffer from high infra-red signature, because their engines, which are a large source of heat as discussed above, are distanced away from the fuselage and are thus easy to observe from substantially all angles.

All of the examples shown and discussed above in regard to FIGS. 1A-1C use the same engine for both vertical and horizontal thrust. Generally, this is a relatively inefficient design. A substantially larger amount of thrust is needed to vertically launch the aircraft, than is needed, or even desired, to maintain horizontal flight. If loiter operations are considered, the problem is even more pronounced. That is because gas turbine engines, and especially turbo jet and turbo fan engines, operate with greater efficiency at a certain operating condition. If a gas turbine engine has been designed to produce a large amount of thrust for vertical take-off, it will not operate efficiently with lesser amounts of thrust for horizontal flight, and will operate with even less efficiency at loiter speeds.

Therefore, another class of STOL/VTOL A/C has been developed in which either two engines are used to provide vertical and horizontal thrust, or complicated gearing is used to transfer power from one engine to a vertical propulsion system and a horizontal propulsion system. For example, U.S. Pat. No. 5,890,441 to Swinson et al. (the "Swinson" Patent) discloses a semi-autonomously directed, autonomously controlled, gyroscopically stabilized, horizontal or vertical take-off and landing (HOVTOL) flying apparatus that employs two vertical lift devices equally and longitudinally spaced from the center of gravity of the aircraft. Enclosed within the aircraft is a continuously integrated drive train apparatus. There can be one or more means for providing power. Connected to the power means and the vertical lift devices are horizontal thrust devices. Swinson uses the integrated drive train apparatus such that when the power system rotates the drive train, the vertical lift apparatus and horizontal thrust apparatus are caused to counter rotate at right angles, simultaneously providing both vertical lift and gyroscopic roll stability, and simultaneously providing both horizontal thrust and gyroscopic yaw stability during flight. FIG. 1 of Swinson illustrates the complex drive train assembly needed to provide power from the power means to both the vertical and horizontal lifting devices.

U.S. Pat. No. 5,823,468 to Bothe (the "Bothe" Patent) discloses a hybrid aircraft that has a lifting body hull and four wing sections arranged in tandem that are pivotally moveable about their neutral axis. As shown in, and described with respect to FIG. 11 in the Bothe patent, Bothe discloses using a gas turbine engine to create electricity to drive at least four propellers. The propeller engines are tiltable to provide vertical and horizontal thrust. In a second embodiment (FIG. 13), Bothe discloses using a series of fans in a fixed vertical orientation from commercially available jet engines driven by electric motors to provide vertical thrust, and horizontal electric fan engines to provide horizontal thrust. Thus, Bothe discloses electric fan engines to provide both vertical and horizontal thrust.

U.S. Pat. No. 4,828,203 to Clifton et al. (the "Clifton" Patent) discloses a vertical and short take-off and landing aircraft comprising a fuselage, a set canard wings, a set of lift fan wings, air deflectors, lift wings, and a pusher propeller. The lift fan wings comprise a generally circular duct extending vertically through the wing, a multi-bladed fan mounted for free rotation axially in the duct, and an internal combustion engine connected to the fan for selectively applying rotational torque to the fan. The air deflectors are arranged about the lift fan wing in a louver-type of system for directing even flow of air to the fan. The lift wings are attached to the fuselage aft of the center of gravity of the aircraft and generally at a location vertically higher than the lift fan wings. The pusher propeller is connected to the internal combustion engine and attached to the fuselage aft of the lift fan wings.

Finally, U.S. Pat. No. 4,125,232 to MacLean et al. (the "MacLean" Patent) discloses a small jet aircraft that has pitched horizontal rotor blades to provide vertical lift, and a conventional jet engine for horizontal flight, the rotor blades being located within openings formed through the wings. The aircraft of MacLean includes two piston engines 13a for vertical lift and one jet engine 13b for horizontal flight.

Thus, the prior art of aircraft that are characterized as STOL/VTOL A/C suffer from either extremely complicated means of transferring power from one engine to both vertical and horizontal propulsion systems, or use only internal combustion engines to provide both vertical and horizontal engines, thereby being inherently inefficient in their operation.

SUMMARY OF THE INVENTION

An object of the present invention is to substantially solve at least the above problems and/or disadvantages and to provide at least the advantages described below. Accordingly, it is an object of the present invention to provide a short take-off and landing/vertical take-off and landing aircraft (STOL/VTOL A/C) that utilizes an internal combustion engine for vertical and horizontal flight, and an electric fan engine for vertical flight to maximize engine efficiency and performance capability.

It is an object of the present invention to provide a gas turbine engine, in the form of either a turbo jet or turbo fan, to provide vertical and horizontal thrust. The gas turbine engine tilts, from a substantially vertical position, to a substantially horizontal position. Either the entire engine or just the engine nozzle may be tilted. Additional vertical thrust is provided by an electric fan engine(s). Utilizing two different types of engines maximizes the performance of each for their intended use. As a result, the STOL/VTOL A/C according to an embodiment of the present invention operates at greater engine efficiency over greater operating conditions than any other STOL/VTOL A/C provided in the prior art.

It is an object of the present invention to provide an STOL/VTOL A/C that uses electrically driven fans that can obtain their power either from batteries or from a generator mounted on the main engine(s). Accordingly, high power density batteries can be used to power the fans, and in one embodiment the batteries are mounted as an integral part of the fan units to make a fan module that can be easily removed and replaced for servicing. This minimizes the length of the high power wiring to reduce losses and save weight. Alternatively, the batteries can be installed around the outside of the fan duct, but in thermal contact with the duct. This uses the fan air flow through the duct to cool the batteries during fan operation, while incurring no loss of fan. The batteries can either be recharged while the aircraft is on the ground, or they may be recharged during the flight with power from a generator mounted on the main turbine engine(s). Further still, because forward flight duration is relatively longer than periods of hovering, the charging power is a small fraction of the flight power It is a further object of the present invention that the electrically fan units can be covered with movable doors. The upper doors can be open to a position that helps guide air into the fans, and the lower doors can move and become the vanes or louvers that control the yawing moment and side forces.

According to a first aspect of the present invention, a vertical take-off and landing (VTOL) aircraft is provided, comprising a primary engine configured to produce thrust for forward flight and thrust for hovering, a plurality of electrically-driven fans arranged about a periphery of a fuselage and wings of the VTOL aircraft, wherein airflow provided by each of the electrically-driven fans is oriented substantially perpendicular to the fuselage of the VTOL aircraft for producing thrust for hovering, a thrust control circuit in communication with each of the plurality of electrically-driven fans, wherein the thrust control circuit is configured to independently control the thrust for hovering provided by each of the plurality of electrically-driven fans to alter a total thrust for hovering provided by the plurality of electrically-driven fans and to alter pitch and roll moments of the VTOL aircraft while hovering, a plurality of vanes located in a fan exhaust of each of the plurality of electrically-driven fans, and an attitude control circuit in communication with each of the plurality of vanes and the thrust control circuit, wherein the attitude control circuit is configured to independently control deflection of each of the plurality of vanes for re-directing the thrust for hovering provided by each of the plurality of electrically-driven fans to control a yaw moment of the VTOL aircraft while hovering.

According to the first aspect of the present invention, the primary engine can be configured to be tilted to a position substantially perpendicular to the fuselage of the VTOL aircraft to produce thrust for hovering, and a nozzle of the primary engine is configured to be re-directed to produce thrust for hovering. According to the first aspect of the present invention, the primary engine comprises a fuel-powered engine, and the fuel-powered engine comprises a turbo jet engine or a turbo fan engine.

According to the first aspect of the present invention, the plurality of electrically-driven fans comprises three electrically-driven fans, and the three electrically-driven fans are located at substantially equally-spaced angles about a center of the VTOL aircraft. Further still, each of the plurality of electrically-driven fans comprises an airflow area that is greater than the primary engine.

According to the first aspect of the present invention, the plurality of electrically-driven fans can be oriented such that the airflow provided by the plurality of electrically-driven fans prevents re-ingestion of exhaust from the primary engine into an air inlet of the primary engine, and the plurality of electrically-driven fans can be oriented such that the airflow provided by the plurality of electrically-driven fans prevents high-speed exhaust from the primary engine from creating a low pressure region under the VTOL aircraft while the VTOL aircraft is grounded.

According to the first aspect of the present invention, the thrust control circuit can control the thrust for hovering provided by each of the plurality of electrically-driven fans by varying a RPM of a respective electrically-driven fan, and the thrust control circuit can control the thrust for hovering provided by each of the plurality of electrically-driven fans by varying a fan rotor pitch of a respective electrically-driven fan.

According to the first aspect of the present invention, the thrust control circuit can control the thrust for hovering provided by each of the plurality of electrically-driven fans by deflecting drag-producing flaps located in the fan exhaust of a respective electrically-driven fan, and the plurality of vanes can be oriented with pivot axes substantially radial to a center of mass of the VTOL aircraft or the plurality of vanes are oriented with pivot axes substantially parallel to the fuselage of the VTOL aircraft.

According to the first aspect of the present invention, electricity for powering each of the plurality of electrically-driven fans can be provided by an electrical generator powered by the primary engine, or electricity for powering each of the plurality of electrically-driven fans is provided by an electricity storage unit associated with the plurality of electrically-driven fans. Still further, the electricity storage unit comprises batteries or high-power-density batteries. The electricity storage units can be separately mounted to each of the plurality of electrically-driven fans to form fan modules. Further still, the electricity storage units can be separately mounted within a vicinity of each of the plurality of electrically-driven fans and in thermal contact with a duct of a respective electrically-driven fan to cool the electricity storage units using airflow from operation of the respective electrically-driven fans.

According to the first aspect of the present invention, the electricity storage units can be re-charged using an electrical generator powered by the primary engine, or the electricity storage units are re-charged by an external electrical energy source while the VTOL aircraft is grounded. During forward flight, each of the electrically-driven fans can be covered with movable doors. The movable doors located on a fan intake of each electrically-driven fan can be configured to guide air into the respective electrically-driven fan when open. According to the first aspect of the present invention, the movable doors located on the fan exhaust of each electrically-driven fan can be configured as vanes to re-direct thrust for hovering when open.

According to a second aspect of the present invention, a vertical take-off and landing (VTOL) aircraft is provided comprising a primary means for providing propulsion configured to produce thrust for forward flight and thrust for hovering, a plurality of electrically-driven means for providing propulsion arranged about a periphery of a fuselage and wings of the VTOL aircraft, wherein airflow provided by each of the electrically-driven propulsion providing means is oriented substantially perpendicular to the fuselage of the VTOL aircraft for producing thrust for hovering, means for controlling thrust in communication with each of the plurality of electrically-driven propulsion providing means, wherein the thrust controlling means is configured to independently control the thrust for hovering provided by each of the plurality of electrically-driven propulsion providing means to alter a total thrust for hovering provided by the plurality of electrically-driven propulsion providing means and to alter pitch and roll moments of the VTOL aircraft while hovering, a plurality of means for deflecting airflow located in an exhaust of each of the plurality of electrically-driven propulsion providing means, and means for controlling attitude in communication with each of the plurality of airflow deflecting means and the thrust controlling means, wherein the attitude controlling means is configured to independently control deflection of each of the plurality of airflow deflecting means for re-directing the thrust for hovering provided by each of the plurality of electrically-driven propulsion providing means to control a yaw moment of the VTOL aircraft while hovering.

According to the second aspect of the present invention, the primary propulsion providing means can be configured to be tilted to a position substantially perpendicular to the fuselage of the VTOL aircraft to produce thrust for hovering, and a nozzle of the primary propulsion providing means is configured to be re-directed to produce thrust for hovering. The primary propulsion providing means comprises a fuel-powered engine means, and the fuel-powered engine means comprises a turbo jet engine means or a turbo fan engine means.

According to the second aspect of the present invention, the plurality of electrically-driven propulsion providing means comprises three electrically-driven propulsion providing means. The three electrically-driven propulsion providing means according to the second aspect of the present invention can be located at substantially equally-spaced angles about a center of the VTOL aircraft. Further, each of the plurality of electrically-driven propulsion providing means comprises an airflow area that is greater than the primary propulsion providing means.

According to the second aspect of the present invention, the plurality of electrically-driven propulsion providing means can be oriented such that the airflow provided by the plurality of electrically-driven propulsion providing means prevents re-ingestion of exhaust from the primary propulsion providing means into an air inlet of the primary propulsion providing means. According to the second aspect of the present invention, the plurality of electrically-driven propulsion providing means can be oriented such that the airflow provided by the plurality of electrically-driven propulsion providing means prevents high-speed exhaust from the primary propulsion providing means from creating a low pressure region under the VTOL aircraft while the VTOL aircraft is grounded. Further still, the thrust controlling means can control the thrust for hovering provided by each of the plurality of electrically-driven propulsion providing means by varying a RPM of a respective electrically-driven propulsion providing means.

According to the second aspect of the present invention, the thrust controlling means can control the thrust for hovering provided by each of the plurality of electrically-driven propulsion providing means by varying a rotor means pitch of a respective electrically-driven propulsion providing means. The thrust controlling means can control the thrust for hovering provided by each of the plurality of electrically-driven propulsion providing means by deflecting drag-producing flap means located in the exhaust of a respective electrically-driven propulsion providing means. The plurality of airflow deflecting means can be oriented with pivot axes substantially radial to a center of mass of the VTOL aircraft, or the plurality of airflow deflecting means can be oriented with pivot axes substantially parallel to the fuselage of the VTOL aircraft.

According to the second aspect of the present invention, electricity for powering each of the plurality of electrically-driven propulsion providing means can be provided by a means for generating electricity powered by the primary propulsion providing means. Electricity for powering each of the plurality of electrically-driven propulsion providing means can be provided by a means for storing electricity associated with the plurality of electrically-driven propulsion providing means. The electricity storing means comprises battery means, and further still, the battery means comprises high-power-density battery means. Electricity storing means can be separately mounted to each of the plurality of electrically-driven propulsion providing means to form modules. Electricity storing means can separately mounted within a vicinity of each of the plurality of electrically-driven propulsion providing means and in thermal contact with a duct means of a respective electrically-driven propulsion providing means to cool the electricity storing means using airflow from operation of the respective electrically-driven propulsion providing means. The electricity storing means can be re-charged using a means for generating electricity powered by the primary propulsion providing means, or the electricity storing means can be re-charged by an external means for generating electricity while the VTOL aircraft is grounded. According to the second aspect of the present invention, during forward flight, each of the electrically-driven propulsion providing means is covered with movable means for covering. The movable covering means located on an intake of each electrically-driven propulsion providing means can be configured to guide air into the respective electrically-driven propulsion providing means when open, and the movable covering means located on the exhaust of each electrically-driven propulsion providing means can be configured as vane means to re-direct thrust for hovering when open.

According to a third aspect of the present invention, a method of controlling thrust and attitude of a vertical take-off and landing (VTOL) aircraft, comprising the steps of a.) producing thrust for forward flight and thrust for hovering using a primary engine, b.) producing thrust for hovering using a plurality of electrically-driven fans arranged about a periphery of a fuselage and wings of the VTOL aircraft, wherein airflow provided by each of the electrically-driven fans is oriented substantially perpendicular to the fuselage of the VTOL aircraft for producing thrust for hovering, c.) independently controlling the thrust for hovering provided by each of the plurality of electrically-driven fans to alter a total thrust for hovering provided by the plurality of electrically-driven fans and to alter pitch and roll moments of the VTOL aircraft while hovering, and d.) independently controlling deflection of each of a plurality of vanes, located in a fan exhaust of each of the plurality of electrically-driven fans, for re-directing the thrust for hovering provided by each of the plurality of electrically-driven fans to control a yaw moment of the VTOL aircraft while hovering.

According to the third aspect of the present invention, the method further comprises tilting the primary engine to a position substantially perpendicular to the fuselage of the VTOL aircraft to produce thrust for hovering, and re-directing a nozzle of the primary engine to produce thrust for hovering. The primary engine comprises a fuel-powered engine. The fuel-powered engine comprises a turbo jet engine. The fuel-powered engine comprises a turbo fan engine. The plurality of electrically-driven fans comprises three electrically-driven fans, and the three electrically-driven fans can be located at substantially equally-spaced angles about a center of the VTOL aircraft. Each of the plurality of electrically-driven fans comprises an airflow area that is greater than the primary engine. The plurality of electrically-driven fans can be oriented such that the airflow provided by the plurality of electrically-driven fans prevents re-ingestion of exhaust from the primary engine into an air inlet of the primary engine, and the plurality of electrically-driven fans can be oriented such that the airflow provided by the plurality of electrically-driven fans prevents high-speed exhaust from the primary engine from creating a low pressure region under the VTOL aircraft while the VTOL aircraft is grounded.

According to the third aspect of the present invention, step (c) comprises the step of varying a RPM of a respective electrically-driven fan to control the thrust for hovering provided by each of the plurality of electrically-driven fans. Further still, step (c) can comprise the step of varying a fan rotor pitch of a respective electrically-driven fan to control the thrust for hovering provided by each of the plurality of electrically-driven fans. Step (c) can further comprise the step of deflecting drag-producing flaps located in the fan exhaust of a respective electrically-driven fan to control the thrust for hovering provided by each of the plurality of electrically-driven fans.

According to the third aspect of the present invention, the plurality of vanes can be oriented with pivot axes substantially radial to a center of mass of the VTOL aircraft. The plurality of vanes can be oriented with pivot axes substantially parallel to the fuselage of the VTOL aircraft.

According to the third aspect of the present invention, the method further comprises powering each of the plurality of electrically-driven fans by an electrical generator powered by the primary engine, or powering each of the plurality of electrically-driven fans by an electricity storage unit associated with the plurality of electrically-driven fans. The electricity storage unit comprises batteries, and the batteries comprise high-power-density batteries. Electricity storage units can separately mounted to each of the plurality of electrically-driven fans to form fan modules. The electricity storage units can be separately mounted within a vicinity of each of the plurality of electrically-driven fans and in thermal contact with a duct of a respective electrically-driven fan, and the method comprises the step of cooling the electricity storage units using airflow from operation of the respective electrically-driven fans.

According to the third aspect of the present invention, the method further comprises re-charging the electricity storage units using an electrical generator powered by the primary engine, re-charging the electricity storage units by an external electrical energy source while the VTOL aircraft is grounded, and covering each of the electrically-driven fans with movable doors during forward flight.

According to the third aspect of the present invention, the movable doors located on a fan intake of each electrically-driven fan can be configured to guide air into the respective electrically-driven fan when open. The movable doors located on the fan exhaust of each electrically-driven fan can be configured as vanes to re-direct thrust for hovering when open. The attitude control circuit is configured to independently control deflection of each of the plurality of vanes to produce side forces in a direction for altering a position of the VTOL aircraft while hovering. Further still, the attitude controlling means is configured to independently control deflection of each of the plurality of airflow deflecting means to produce side forces in a direction for altering a position of the VTOL aircraft while hovering.

According to the third aspect of the present invention, the method further comprises independently controlling deflection of each of the plurality of vanes to produce side forces in a direction for altering a position of the VTOL aircraft while hovering.

BRIEF DESCRIPTION OF THE DRAWINGS

The various objects, advantages and novel features of the present invention will be best understood by reference to the detailed description of the preferred embodiments that follows, when read in conjunction with the accompanying drawings, in which:

FIGS. 11A-11E illustrate several side views of the STOL/VTOL A/C shown in FIGS. 2, 8, and during take-off as discussed in regard to the method of FIG. 10

FIG. 12 illustrates a take-off scenario for the STOL/VTOL A/C shown in FIGS. 2, 8, and 9 according to an embodiment of the present invention FIGS. 15A and 15B illustrate a front view of the STOL/VTOL A/C shown in FIGS. 2, 8, and 9 providing roll control according to an embodiment of the present invention FIGS. 17A and 17B illustrate a front view of the STOL/VTOL A/C shown in FIGS. 2, 8, and 9 providing roll control according to another embodiment of the present invention.

DETAILED DESCRIPTION OF THE PREFERRED/EXEMPLARY EMBODIMENTS

Figure 1A:
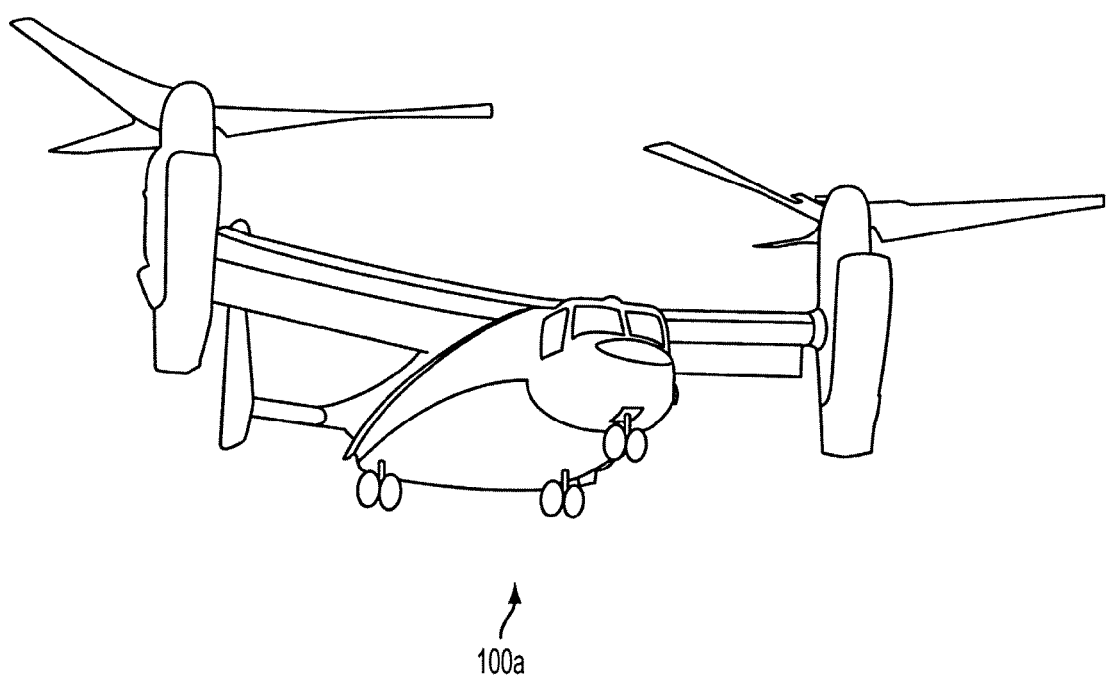
FIGS. 1A-1C illustrate perspective views of several typical aircraft with tilt engine capabilities.
Figure 1B:
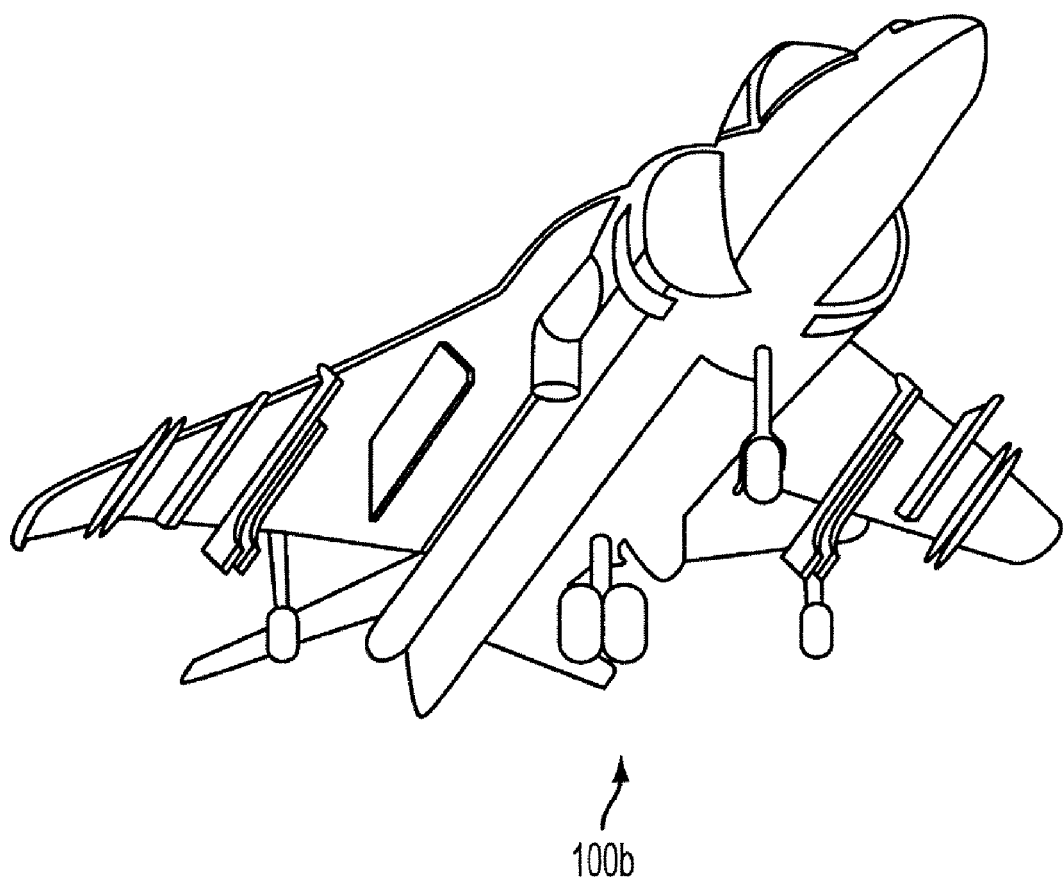
Figure 1C:
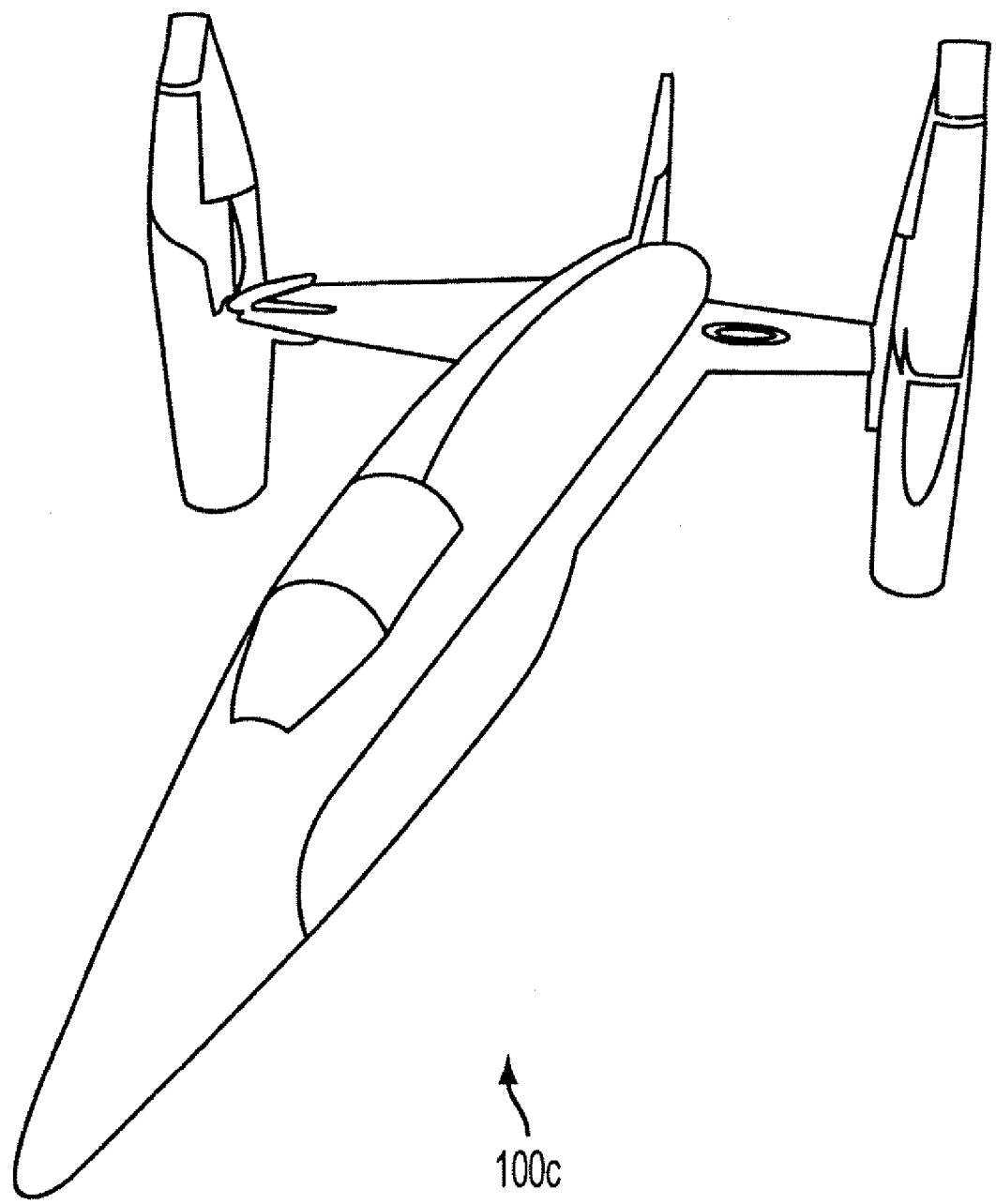

Several embodiments of the present invention will now be described in detail with reference to the annexed drawings. In the drawings, the same or similar elements are denoted by the same reference numerals even though they are depicted in different drawings.

Normal short take-off and landing/vertical take-off and landing aircraft (STOL/VTOL A/C) require large amounts of thrust or power from the engines for take-off and landing. This means that the engines are much larger and heavier than needed for cruise flight, and they are also operating at low throttle settings for most of the flight. On a gas turbine engine, this low throttle setting results in higher specific fuel consumption than a normal aircraft would have.

The present invention provides a means of efficiently obtaining the high thrust for takeoff and landing while retaining a smaller, lighter and more fuel efficient main engine. Accordingly, a STOL/VTOL A/C according to an embodiment of the present invention comprises a gas turbine engine or engines (i.e., turbojet or turbo fan engine or engines). These engines have the ability to thrust predominantly horizontally for normal flight or vertically for vertical take-off and landing. The thrust direction can be changed either by turning the engine nozzle or by tilting the entire engine or engines. The accompanying drawings show a tilting engine version. In addition, to achieve the required thrust for vertical take-off and short take-off configurations, electric fan engines are provided for the STOL/VTOL A/C according to an embodiment of the present invention.

Figure 2A:
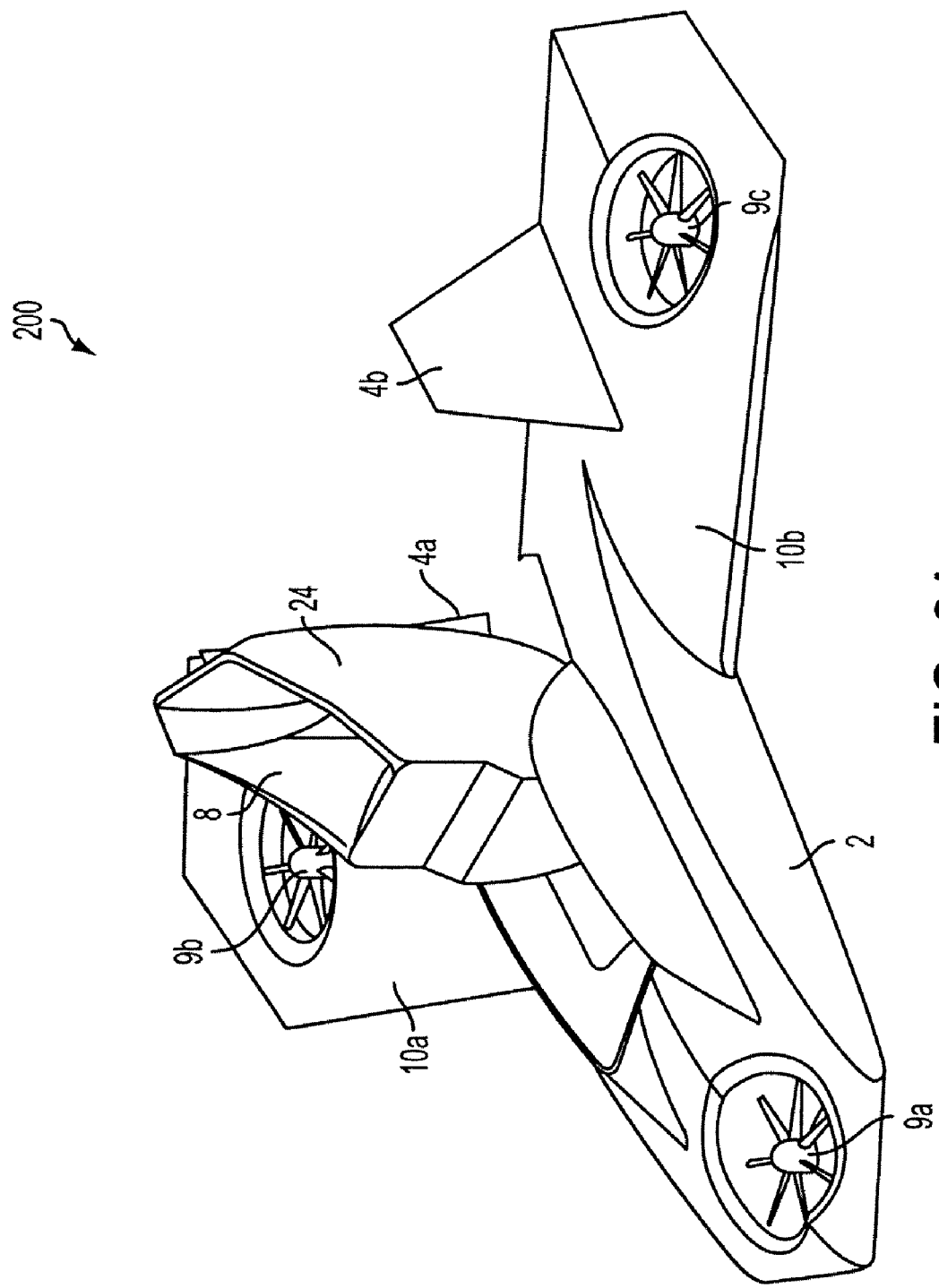
FIGS. 2A and 2B illustrate front perspective views of a short take-off and landing/vertical take-off and landing aircraft (STOL/VTOL A/C) according to an embodiment of the present invention.
Figure 2B:
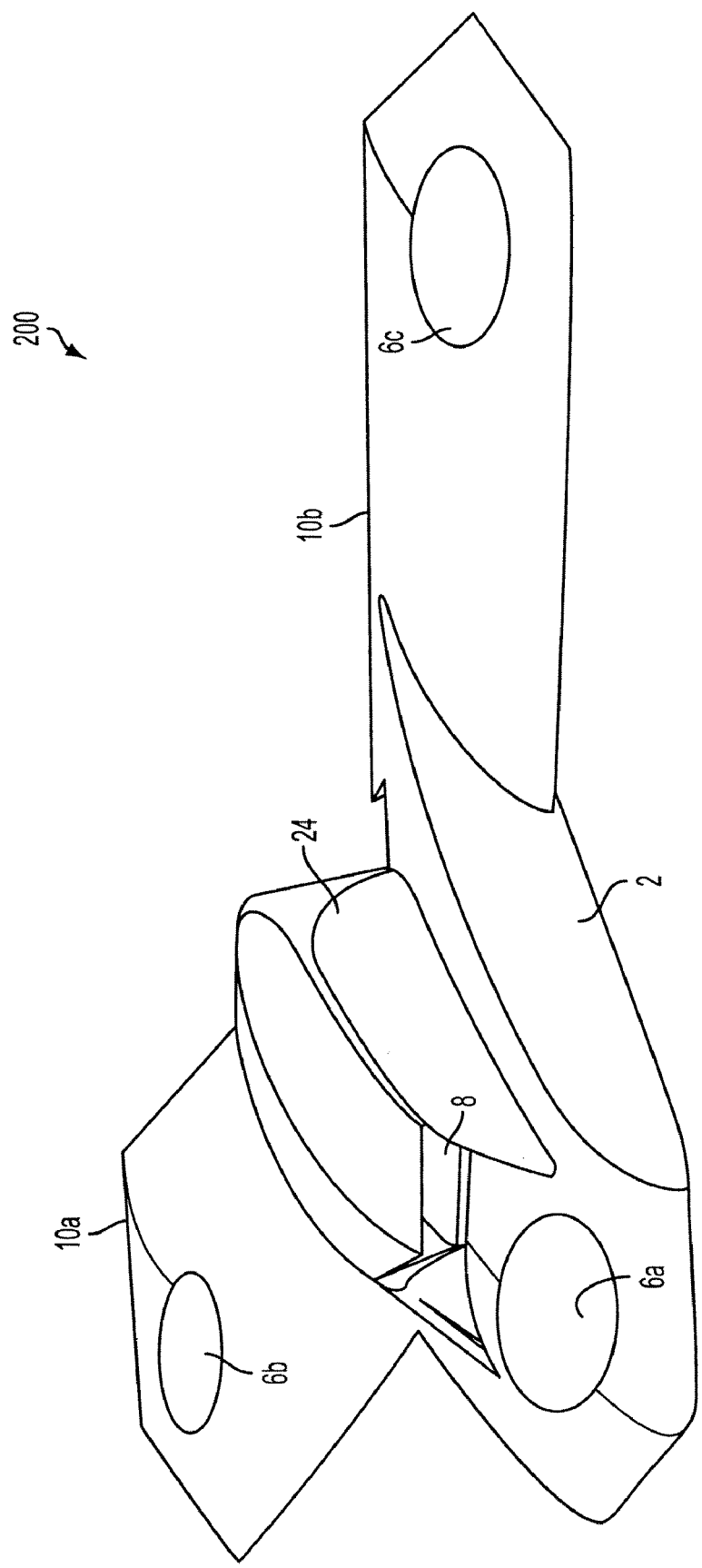

FIGS. 2A and 2B illustrate front perspective views of short take-off and landing/vertical take-off and landing aircraft (STOL/VTOL A/C) 200 according to an embodiment of the present invention. STOL/VTOL A/C 200 is a single engine STOL/VTOL A/C, and according to an exemplary embodiment of the present invention comprises a fuselage 2, a plurality of vertical stabilizer/rudder assemblies 4a,b, two wings 10a,b, an internal combustion engine (engine 8) and a plurality of electric fan engines (fan engines) 9a,b,c. Engine 8 can tilt from a substantially vertical configuration, for vertical flight or hovering, to a substantially horizontal configuration, for forward flight. Tilting can also be accomplished over a much smaller range of angles to maximize engine 8 performance, and hence performance of the STOL/VTOL A/C 200 according to an embodiment of the present invention. Engine 8 is surrounded by an engine nacelle 24. Other components include, but not shown, landing gear, lights, communication antennas, and many other components.

Shown especially in regard to FIG. 2B are retractable fan doors 6a,b,c (vertical stabilizer/rudder assemblies 4a, b have been omitted for clarity). Fan doors 6a,b,c cover fan engines 9a,b,c, respectively, during horizontal flight. According to an exemplary embodiment of the present invention, fan doors 6a,b,c comprise both an upper and lower portion, though, as one of ordinary skill in the art of the present invention can appreciate, this need not always be the case. During conventional flight, fan engines 9a,b,c are covered with movable fan doors 6a,b,c. The upper surface of fan doors 6a,b,c open to a position that helps guide air into the fan engines 9a,b,c. The lower fan doors 6a,b,c can move and become vanes or louvers (vanes 12) that can assist in controlling the yawing moment and side forces.

Although STOL/VTOL A/C 200, 300, 400 operate according to well known principles of flight, it is the unique and special characteristics and features described herein according to several exemplary embodiments of the present invention that provide STOL/VTOL A/C 200, 300, 400 with its unique flight characteristics. The unique and special characteristics and features according to the several exemplary embodiments of the present invention will be described in greater detail below in view of the accompanying drawing figures.

Figure 4:
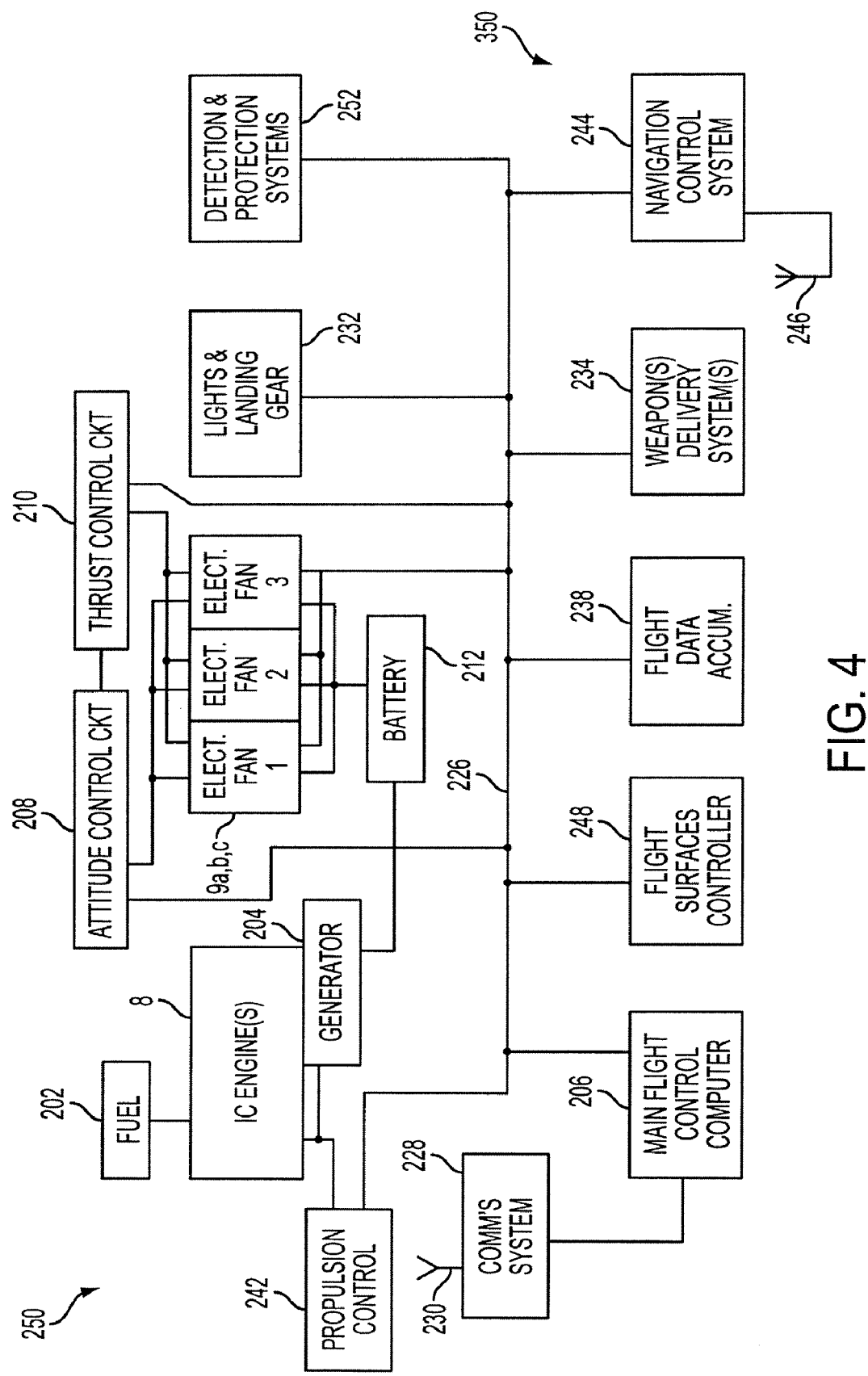
FIG. 4 illustrates a block diagram of an aircraft control system for controlling the VTOL/STOL A/C shown in FIGS. 2, 8, and 9 according to an embodiment of the present invention.
Figure 5:
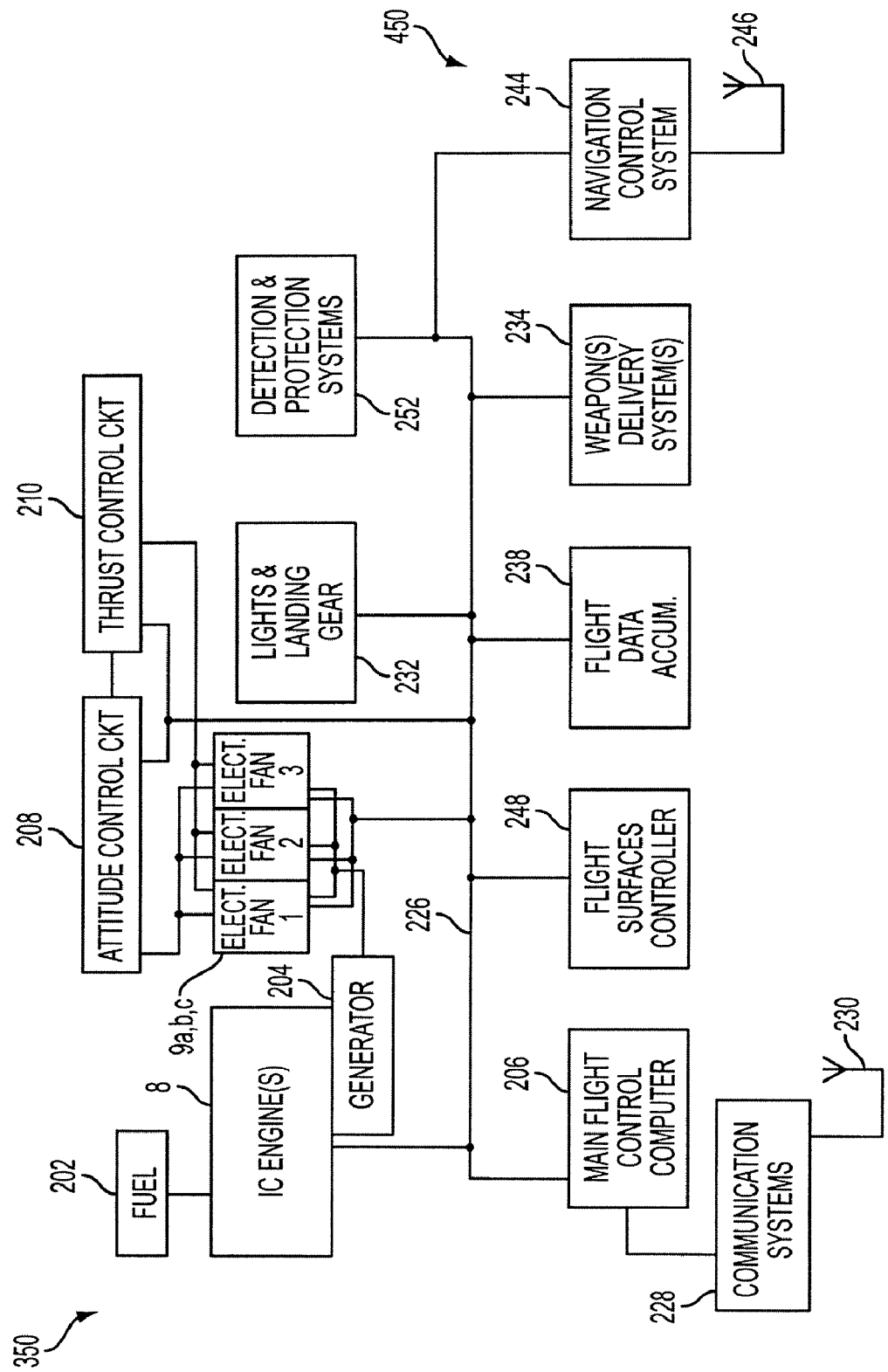
FIG. 5 illustrates a block diagram of an aircraft control system for controlling the VTOL/STOL A/C shown in FIGS. 2, 8, and 9 according to another embodiment of the present invention.

FIGS. 4 and 5 illustrates two block diagrams of an aircraft control system for controlling the STOL/VTOL A/C 200, 300, 400 shown and described with respect to FIGS. 2, 8, and 9 according to several embodiments of the present invention. From here on, reference shall be made to STOL/VTOL A/C 200 to describe the unique advantages and characteristics of the STOL/VTOL A/C that pertain to all the STOL/VTOL A/C according to the various embodiments of the present invention. In several circumstances, however, the different embodiments of the STOL/VTOL A/C will have different unique advantageous characteristics that will be described in reference to their particular drawing figures. FIGS. 4 and 5 illustrate, with only several minor exceptions, primarily the internal components of the STOL/VTOL A/C 200 according to an embodiment of the present invention.

For purposes of discussion of FIG. 4, reference shall only be made to STOL/VTOL A/C 200, though, as one of ordinary skill in the art can appreciate, aircraft control system 250 applies to STOL/VTOL A/C 300, 400 as well. Main control system 206 communicates With all of the other components of aircraft control system 400 via main communication bus 226. Main flight control computer 206 acquires information from, and provides instructions and information to landing gear/lights system 232, propulsion control system 242, weapons systems controller 234, flight data accumulator 238, attitude control circuit 208, thrust control circuit 210, flight surfaces controller 248, and detection/protection system 252. Main flight control computer 206 also communicates with communications system 228, that receives and transmits information via first communication antenna 228. Main flight control computer 206 receives navigation data from navigation control system 244, which receives global position data via navigation antenna 246. Weapons system controller 234 can control one or more weapon system in an exemplary embodiment of the present invention (not shown), and flight data accumulator 238 receives flight data from an air speed instrumentation system, an altimeter, vertical speed instrumentation, rate of turn instrumentation, gyroscopic data, and engine data. Propulsion control system 242 controls and monitors one or more internal combustion engines 8. Flight surface control system 248 controls and receives status information from flight control surfaces such as ailerons, flaps, elevators, rudder, and trim tabs, among other types of flight control surfaces. Detection and protection system 252 can monitors and control a radar system, electronic counter measures system, chaff and flare protection system, infra-red detection system and camera/video systems, depending on what is carried on the STOL/VTOL A/C 200. A complete and detailed discussion of any of these systems is beyond the scope of this document, and as such, for purpose of brevity, shall be omitted.

The current operating condition of engine 8 is maintained and updated by a main flight control computer 206. Main flight control computer 206 monitors the current airspeed of the STOL/VTOL A/C 200, the current flight attitude (i.e., bank left, bank right, climb, descent, acceleration, deceleration), the desired flight attitude (i.e., bank left, bank right, climb, descend, accelerate, decelerate), the desired airspeed, the current action the STOL/VTOL A/C 200 is taking (weapons delivery, electronic countermeasures, among others), the desired action the STOL/VTOL A/C 200 is to take, current environmental conditions (air temperature, density, altitude, among others), fuel flow and fuel capacity, weight, external payloads, status of electrical and hydraulic systems, and various other factors.

As discussed above, engine 8 can tilt to maximize a current operating condition of the engine according to am embodiment of the present invention. The current operating condition of engine 208 is maintained and updated by a main flight control computer 206. Main flight control computer 206 monitors the current airspeed of the STOL/VTOL A/C 200, the current flight attitude (i.e., bank left, bank right, climb, descent, acceleration, deceleration), the desired flight attitude (i.e., bank left, bank right, climb, descend, accelerate, decelerate), the desired airspeed, the current action the STOL/VTOL A/C 200 is taking (weapons delivery, electronic countermeasures, among others), the desired action the VTOL/STOL A/C 200 is to take, current environmental conditions (air temperature, density, altitude, among others), fuel flow and fuel capacity, weight, external payloads, status of electrical and hydraulic systems, and various other factors. These factors can be categorized into two main categories: current state of the STOL/VTOL A/C 200, and the desired state of the STOL/VTOL A/C 200.

According to an exemplary embodiment of the present invention, an air volume control circuit 214 (not shown), is in communication with main flight control computer 206 via communications bus 226, and processes pertinent information and generates a nacelle tilt angle signal that controls the tilt of engine 8. As one of ordinary skill in the present invention can appreciate, the main flight control computer 206 can perform all the same calculations as the air volume control circuit 214.

To maximize the current operating condition of the engine 8, the main flight control computer 206 first determines whether a change to the current operating condition of engine 8 is warranted based on the desired state of the STOL/VTOL A/C 200. The main flight control computer 206 acquires a current reading from an air volume detection circuit 216 (not shown) that is located in the engine 8, as well as the current airspeed, altitude and temperature. The current and desired airspeed, air temperature and altitude information is then forwarded to the air volume control circuit 214. The air volume control circuit 214 generates throttle settings based on the current and desired airspeed, altitude, and temperature. Based on the throttle settings, air volume control circuit 214 generates a nacelle tilt angle. The engine tilt angle is then forwarded to the engine tilt mechanism 218 (not shown). The engine tilt mechanism 218 resides within and adjacent to engine 8, and tilts engine 8 to the calculated nacelle tilt angle. The engine tilt mechanism 218 also provides an angle measurement feedback signal, which is reported back to the air volume control circuit 214, verifying that the correct tilt nacelle tilt angle has indeed been accomplished. The air volume detection circuit 216 measures the air flow volume through the engine 8, which is then reported back to main flight control computer 206, which monitors the airspeed. Finally, the main flight control computer 206 checks all the parameters described above, to see if the desired condition has been achieved. If it has not, then a correcting signal is sent to the air volume control circuit 214. If it has, then the main flight control computer 206 and air volume control circuit 214 continue to monitor the various aforementioned parameters until a change in the configuration of the STOL/VTOL A/C 200 is desired.

According to an exemplary embodiment of the present invention, the thrust control circuit 210 is in communication with each of the plurality of electrically-driven fan engines 9a,b,c. Thrust control circuit 210 is configured to independently and/or jointly control the thrust provided by each of the plurality of fan engines 9a,b,c to alter a total thrust for hovering, take-off, and landing. Furthermore, thrust control circuit 210 can control the thrust provided by each of the fan engines 9a,b,c to alter pitch, yaw, and roll moments of the STOL/VTOL A/C 200 during hovering, take-off and landing. Thrust control circuit 210 controls the speed and direction of the fan engines 9a,b,c. As one or ordinary skill in the art can appreciate, the thrust provided by an electrical fan engine, such as fan engines 9a,b,c, is dependent upon the fan blades and speed at which the fan blades rotate. Preferably, the fan blades are a fixed pitch in fan engines 9a,b,c, though, as one or ordinary skill in the art can appreciate, this need not always be the case. According to another exemplary embodiment of the present invention, the pitch of the fan blades of fan engines 9a,b,c can be varied. The rotational speed of the fan blades determines the amount of thrust, within practical considerations, that each fan engine 9a,b,c can generate.

Thrust control circuit 210 can also alter the pitch, yaw, and roll moments of the STOL/VTOL A/C 200 during hovering, take-off, and landing. It does this by controlling the speed and direction of rotation of the fan engines 9a,b,c in conjunction with the control provided by attitude control circuit 208. Attitude control circuit 208 controls the attitude of the STOL/VTOL A/C 200 during hover, take-off and landing by controlling a plurality of vanes 12 associated with each fan engine 9a,b,c. Control of thrust, pitch and roll moments is discussed in greater detail below. Attitude control circuit 208 is configured to independently control deflection of each of the plurality of vanes 12 for re-directing the thrust for hovering, take-off and landing provided by each of the plurality of fan engines 9a,b,c to control pitch, yaw, and roll moments of the STOL/VTOL A/C 200 according to an embodiment of the present invention. Attitude control circuit 208 communicates with thrust control circuit 210 to control the total thrust provided by each fan engine 9a,b,c, and to control the pitch, roll and yaw moments of STOL/VTOL A/C 200.

Also shown in FIGS. 4 and 5 is generator 204. In FIG. 4, a battery 212 is connected to the generator 204. In FIG. 4, generator 204 is mechanically connected to engine 8 in a manner well known to those of ordinary skill in the art of the present invention. As engine 8 rotates, a pulley assembly in connection with engine 8 and generator 204 rotates, wherein generator 204 produces electricity. In this case, the electricity is direct current (DC) electricity, and this provides the power to fan engines 9a,b,c. A controller within each fan engine 9a,b,c (not shown) operates with control signals provided by thrust control circuit 210 to control fan engines as discussed above and below in greater detail. The power for the fan engines 9a,b,c is stored, however, in battery 212. Battery 212 can be any type of battery, including single use (i.e., non-rechargeable batteries), but preferably battery 212 is a rechargeable battery. More preferably, battery 212 is a lithium-Ion (Li-Ion) type rechargeable battery. Li-Ion rechargeable batteries operate at many different voltages and amp-hours, and have a significant advantage over other types of rechargeable batteries in that they provide extremely high power versus battery weight. For example, recently developed Li-Ion batteries can provide up to 5 kilo-watts per kilogram of battery weight. Furthermore, Li-Ion batteries can provide extremely high discharge current for brief periods of time. Furthermore, the conditions under which engine fans 9a,b,c operate are well suited for Li-Ion batteries. That is, large to high amounts of current for brief periods of time. According to an exemplary embodiment of the present invention, STOL/VTOL A/C 200 is designed to take-off in a relatively short period of time (about 20 seconds) and land in about a minute. Otherwise, engine fans 9a,b,c are unused except for hovering purposes, which is an extraordinary flight regime. Another time engine fans 9a,b,c can be used are during STOL operations, which is discussed in greater detail below. During the majority of flight time, batteries 212 are unused, and are constantly charged by generator 204, which is a preferred mode of operation. In this mode of operation, the Li-Ion batteries 212 may not be deeply discharged, which greatly reduces Li-Ion battery life.

Thus, if a STOL/VTOL A/C 200 uses control system 250 according to an embodiment of the present invention, one or more batteries 212 will be used to provide electrical power to the fan engines 9a,b,c. The advantage of this implementation is that if there is a generator failure, the batteries can store the power and provide it to the fan engines 9a,b,c.

In FIG. 5, battery 212 has been omitted from flight control system 350. As can be seen from FIG. 5, generator 204 is hooked up directly to fan engines 9a,b,c. The disadvantage to this configuration is, as discussed above, if the generator fails, there is no battery power in reserve. The fan engines 9a,b,c will not operate without an output from the generator. Because of the large power requirements of the fan engines 9a,b,c, batteries 212 must be suitably sized, and this will add some weight, on the order of about 4% of the gross take-off weight, to the STOL/VTOL A/C 200.

Any and all components of the aircraft control systems 250, 350, shown and discussed in regard to FIGS. 4 and 5, including, but not limited to, main flight control computer 206, attitude control circuit 208, and/or thrust control circuit 210 (among other components), can be any suitable type of electrical or electronic device capable of performing the functions for aircraft control systems 250, 350 and its components discussed herein. For example, the aircraft control systems 250, 350 can be comprised of hardware, software, firmware or any suitable combination thereof.

Alternatively, the aircraft control systems 250, 350, and any and all components thereof, including, but not limited to, main flight control computer 206, attitude control circuit 208, and/or thrust control circuit 210 (among other components), can be comprised of any suitable type of processor, including any type of microprocessor, microcontroller, digital signal processor (DSP), application-specific integrated circuit (ASIC), programmable read-only memory (PROM), erasable programmable read-only memory (EPROM), electrically-erasable programmable read-only memory (EEPROM), or the like. The aircraft control systems 250, 350, and any and all components thereof, including, but not limited to, main flight control computer 206, attitude control circuit 208, and/or thrust control circuit 210 (among other components), can be connected to or include a memory, such as, for example, any type of computer memory or any other type of electronic storage medium, such as, for example, read-only memory (ROM), random access memory (RAM), cache memory, compact disc read-only memory (CDROM), electro-optical memory, magneto-optical memory, or the like. The processor and memory can be used, for example, to perform some or all of the functions of the aircraft control systems 250, 350, and any and all components thereof, including, but not limited to main flight control computer 206, attitude control circuit 208, and/or thrust control circuit 210 (among other components), described herein. As will be appreciated based on the foregoing description, the memory can be programmed using conventional techniques known to those having ordinary skill in the art of computer programming. For example, the actual source code or object code of the computer program can be stored in the memory.

Figure 3:
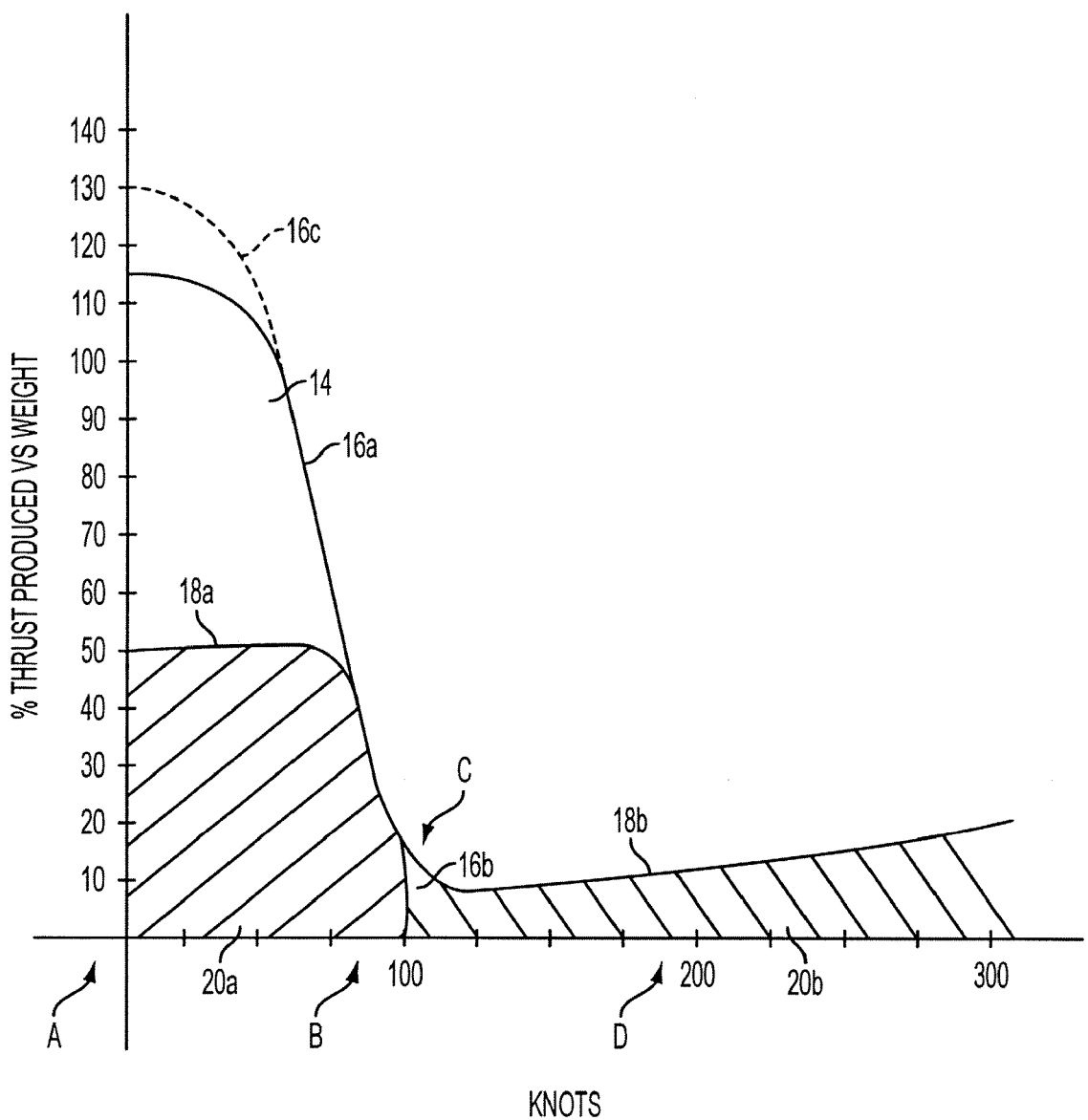
FIG. 3 illustrates a plot of airspeed versus percentage of thrust required for equilibrium flight at various airspeeds for the STOL/VTOL A/C shown in FIGS. 2, 8, and 9 according to an embodiment of the present invention.

FIG. 3 illustrates a plot of airspeed versus percentage of thrust required for equilibrium flight at various airspeeds for STOL/VTOL A/C 200, 300, 400 shown in FIGS. 2, 8, and 9 according to an embodiment of the present invention. FIG. 3 is directed primarily to illustrating power requirements from engine 8 and fan engines 9*a,b,c* from take-off to horizontal thrust. As one of ordinary skill in the art can appreciate, a similar type of plot can be shown for the transition from horizontal flight to landing or hover.

In FIG. 3, position A represents STOL/VTOL A/C 200 on the ground, with no vertical or horizontal components of thrust. In order to take-off, both engine 8 and fan engines 9*a,b,c* are required to produce substantially maximum thrust. The total amount of thrust required to take-off for STOL/VTOL A/C 200 is about 1.15 times the gross take-off weight of STOL/VTOL A/C 200. This is represented by the 1.15 on the y axis, showing the percentage of thrust produced versus weight of the STOL/VTOL A/C 200. For example, if STOL/VTOL A/C 200 weighs 1000 lbs., the total amount of thrust required for takeoff is about 1,150 lbs of thrust. If, however, take-off took place at high altitude and/or a hot day, then an extra margin of take-off thrust is required, which is about 1.3 times the gross take-off weight. In this case, then, for a gross take-off weight of 1000 lbs., the amount of thrust provided at sea level would be 1,300 lbs. Engine 8 (the gas turbine engine), provides all the thrust under line 18*a*, area 20*a*, which is about 50% of the total take-off thrust. Area 14, which is bounded by line 18*a*, the y axis and line 16*a*, is the thrust provided by fan engines 9*a,b,c*. This is a substantial amount of thrust. As engine 8 tilts from its substantially vertical position to a horizontal position, the A/C accelerates, more lift is made by the wings, and fan engines 9*a,b,c* provide less and less thrust to STOL/VTOL A/C 200. The thrust required from fan engines 9*a,b,c* falls off rapidly, as line 16*a* demonstrates. At point C, the thrust required from fan engines 9*a,b,c* falls off to zero percent, because now STOL/VTOL A/C 200 has reached a point in horizontal flight where substantially all the lift required to remain aloft is provided by wings 10*a, b* and other lifting surfaces. Fan engines 9*a,b,c* are shut off, and either retract within wings 10*a,b* (STOL/VTOL A/C 400), or are covered by fan doors 6*a,b,c* (STOL/VTOL A/C 200, 300). Thereafter, line 18*b* illustrates the increase in airspeed of STOL/VTOL A/C 200 as the thrust from engine 8 approaches about 20%. Area 20*b* indicates that all the thrust is provided by engine 8.

Electric Fan Engines

The aircraft has some suitable number of electrically driven fans, oriented in a predominantly horizontal plane, to produce vertical thrust. These fans can have a much larger flow area than the main turbine engine, providing very high mass flow, improved propulsion efficiency, a much cooler and lower velocity flow to minimize heating and blasting of the ground. Ideally a minimum of 3 fans is used, located in the periphery of the aircraft and at roughly equally spaced angles around the center of the aircraft (although any number of fans can be used). However, any suitable number of fans can be used. The fan orientation can be appropriately selected so the fan flow helps prevent re-ingestion of the turbine exhaust back into its air inlet. The fans can also be oriented to minimize any "suck down" effects where the high speed exhausts create a low pressure region under the aircraft when it is on the ground. This means that there is no need for a large amount of excess thrust to take-off. These fans can be controlled to vary their thrust either by varying the motor RPM or by varying the fan rotor pitch or by varying drag producing flaps in the fan flow. The thrust can be varied independently on the multiple fans to control the total thrust, and the pitching and rolling moments of the aircraft in hover. This fan thrust control is much faster response than the throttle on the main turbine engine(s), allowing more precise control of the aircraft.

The electrically driven fans can obtain their power either from batteries or from a generator mounted on the main engine(s). Given the very short duration of vertical flight needed to take-off and land, the preferred implementation uses high power density batteries to power the fans. In one implementation, the batteries are mounted as an integral part of the fan units to make a fan module that is easily removed and replaced for servicing. This minimizes the length of the high power wiring to reduce losses and save weight. The batteries can be installed around the outside of the fan duct, but in thermal contact with the duct. This uses the fan air flow through the duct to cool the batteries during fan operation, while incurring no loss of fan performance. The batteries can either be recharged while the aircraft is on the ground, or they may be recharged during the flight with power from a generator mounted on the main turbine engine(s). Given the long flight duration relative to the short hover mode duration the charging power is a small fraction of the flight power.

Figure 6:
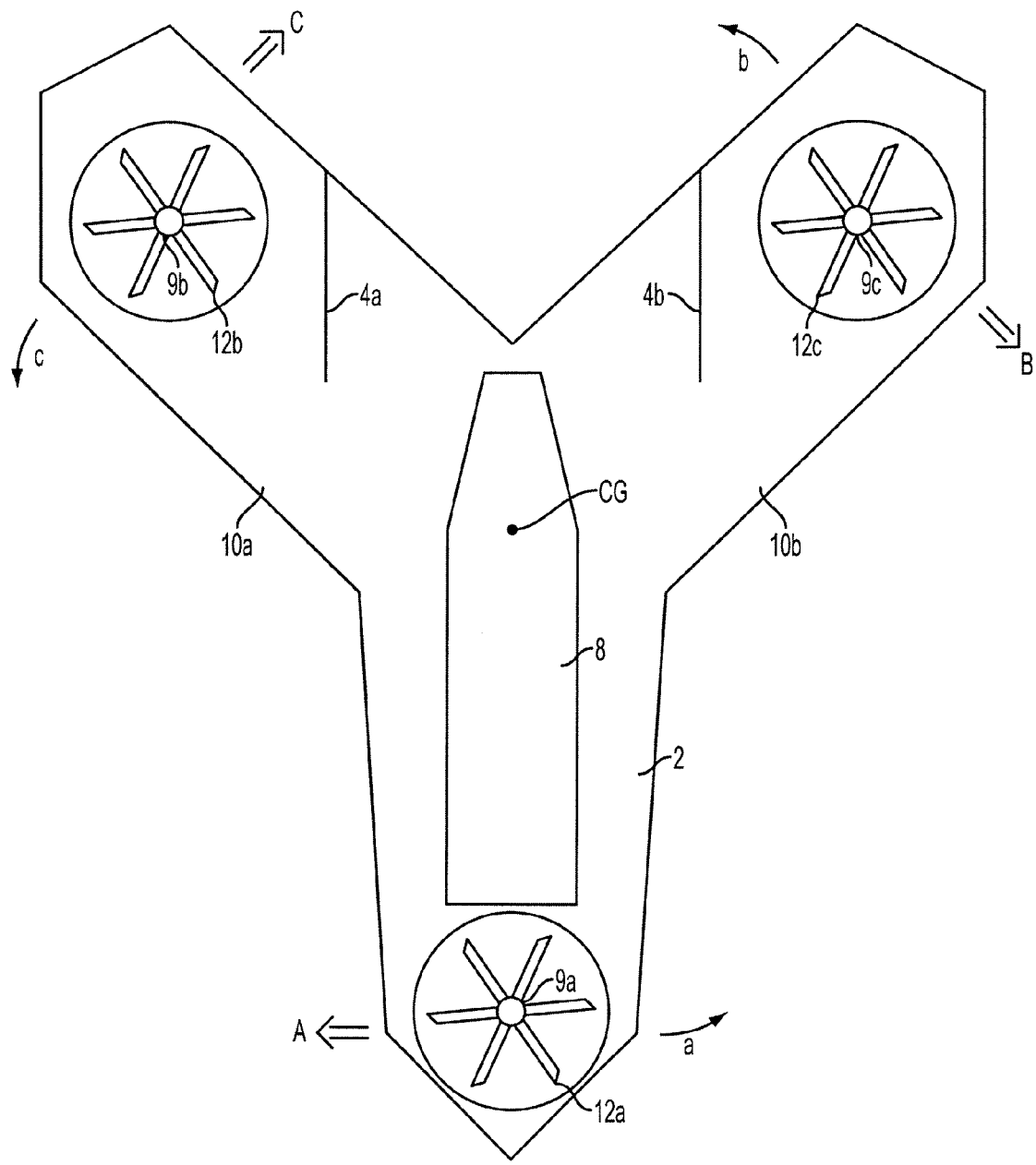
FIG. 6 illustrates a configuration of a plurality of electric fans in the STOL/VTOL A/C shown in FIGS. 2, 8, and 9 according to an embodiment of the present invention.
Figure 7:
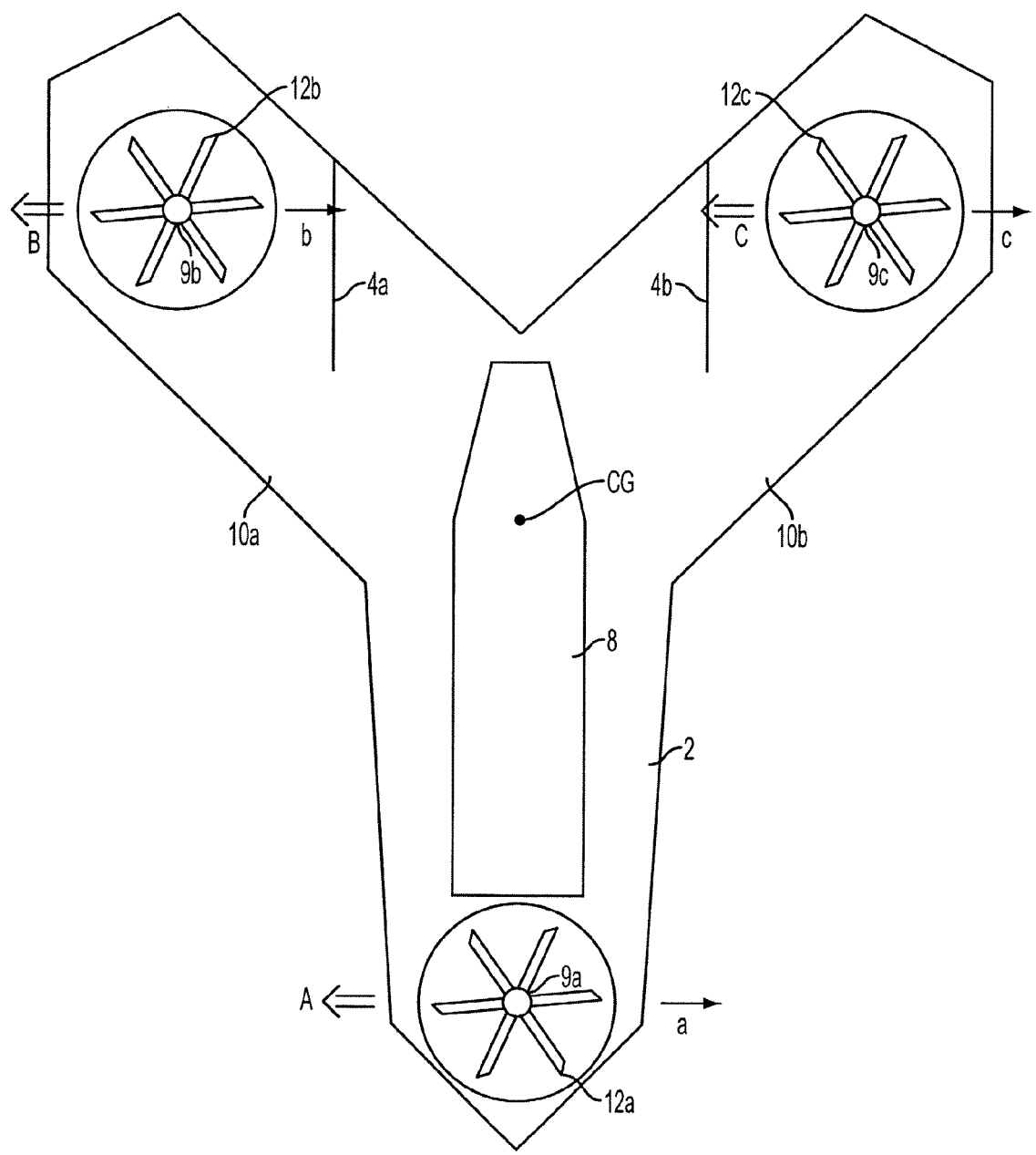
FIG. 7 illustrates a second configuration of a plurality of electric fans in the STOL/VTOL A/C shown in FIGS. 2, 8, and 9 according to another embodiment of the present invention.

FIG. 6 illustrates a first configuration of a plurality of electric fan engine 9*a,b,c*, and FIG. 7 illustrates a second configuration of a plurality of electric fan engines 9*a,b,c* in the STOL/VTOL A/C 200, 300, 400 shown in FIGS. 2, 8, and 9 according to an embodiment of the present invention. Preferably, mounted below the fans 9*a,b,c* are a plurality of vanes 12 to direct the thrust away from the normal vertical direction. In one implementation, the vanes 12 are oriented with their pivot axes approximately radial to the center of mass (shown as "CG") of the STOL/VTOL A/C 200. This is illustrated in FIG. 6. When the vanes 12 are oriented with their pivot axes approximately radial to the center of mass of the STOL/VTOL A/C 200, the maximum possible yawing moment is provided when the vanes 12 are all used together. Shown in FIG. 6 are thrust vectors A, B and C. As viewed from the top of STOL/VTOL A/C 200, vane 12*a* is deflected to the left, vane 12*c* is deflected to the leading edge of wing 10*b*, and vane 12*b* is deflected to the trailing edge of wing 10*a*. When fan engines 9*a,b,c* create thrust vectors A, B, C, a large twisting force in the counter clockwise direction (as viewed from above STOL/VTOL A/C 200) is created, causing STOL/VTOL A/C 200 to rotate (yaw) in the counter clockwise direction. This yaw or counter clockwise twisting is represented by arrows a, b, c.

The vanes 12 on the various fan engines 9*a,b,c* can be deflected in different amounts and different directions to produce a direct side force in any arbitrary direction. While the magnitude of this side force is small compared to the total fan thrust (about 10% of the weight of the STOL/VTOL A/C 200), it does allow for small corrections in the STOL/VTOL A/C 200 position with much faster response time than the more traditional methods which involve tilting the entire STOL/VTOL A/C 200 to make the side force.

Another implementation of the vanes 12 is to have them oriented predominantly with their axes in the fore-aft direction. This is illustrated in FIG. 7. This also allows for production of yaw moment, although slightly reduced compared to the radial orientation. However, this orientation allows the use of the vanes 12*a,b,c* to a higher airspeed during the transitions between hovering and forward flight. This orientation also provides for larger horizontal forces to the sides, but not to the front or rear. Shown in FIG. 7 are thrust vectors A, B and C. As viewed from the top of STOL/VTOL A/C 200, vane 12*a* is deflected to the left, as are vanes 12*b* and 12*c*. When fan engines 9*a,b,c* create thrust vectors A, B, C, a significant sidewards force in the left direction (as viewed from above STOL/VTOL A/C 200) is created, causing STOL/VTOL A/C 200 to move to the right. This rightward movement is represented by arrows a, b, c. When all the fan engines 9*a,b,c* are in this particular configuration, a side force of about 10% of the weight of the STOL/VTOL 200 is created; this is enough to be able to finely tune, though not too rapidly, the landing position of STOL/VTOL A/C according to an exemplary embodiment of the present invention.

As discussed above, two primary components of aircraft control systems 250, 350 are attitude control circuit 208 and thrust control circuit 210. Thrust control circuit 210 controls the speed of rotation of fan engines 9*a,b,c*, and attitude control circuit 208 controls the orientation of the plurality of vanes 12 associated with each fan engine 9*a,b,c*. As one of ordinary skill in the art of the present invention can appreciate, each fan engine 9*a,b,c* can have its thrust set to a different operating point, as each set of vanes 12 for each fan engine 9*a,b,c* can be set to deflect in a different amount. For example, fan engine 9*a* can be set to produce 100% of its maximum thrust output, and its vanes 12 can be set to deflect at a 45° angle, in a first direction. Fan engine 9*b* can be set to produce only 75% of its maximum thrust output, while its vanes can be set to deflect at an angle of 45° in a direct opposite or different from that of the vanes 12 for fan engine 9*a*, and so on.

Furthermore, according to another embodiment of the present invention, vanes 12 can be situated not only on the bottom of fan engines 9*a,b,c*, but they can be located on the top of fan engines 9*a,b,c*. When only the lower vanes 12*a* are to be used, upper vanes 12*b* are in a substantially perpendicular position in regard to fan engines 9*a,b,c*. To use upper vanes 12*b*, fan engines can be made to rotate in an opposite direction than when lower vanes 12*a* are used. This provides a unique advantage when providing pitching and rolling forces, as discussed below in greater detail in regard to FIGS. 14-17. According to still another exemplary embodiment of the present invention, vanes 12 can be made to rotate, so that neither configuration as shown in FIG. 6 or 7 are fixed or static. Further still, this same feature (i.e., rotating vanes 12) can be implemented if using both lower and upper vanes 12*a, b*.

Figure 14A:
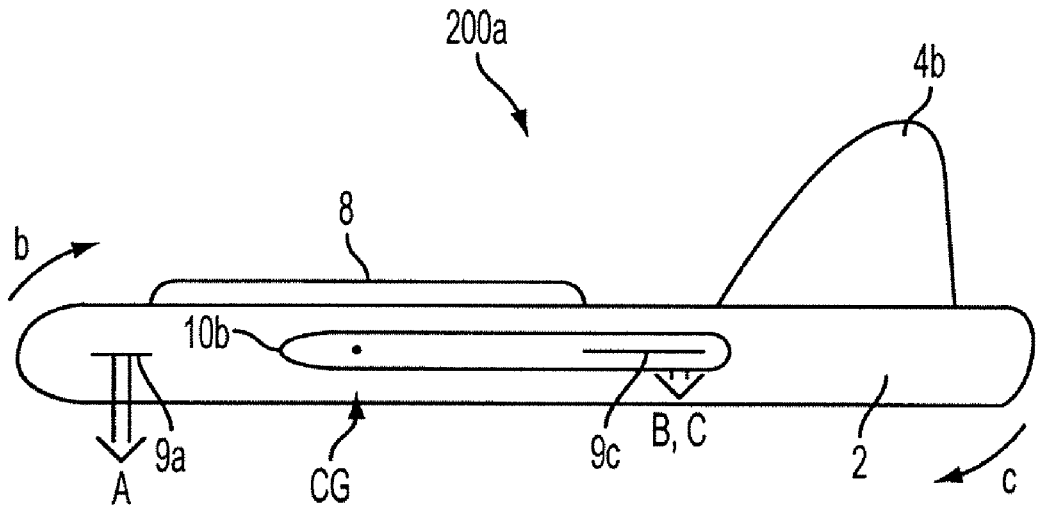
FIGS. 14A and 14B illustrate a side view of the STOL/VTOL A/C shown in FIGS. 2, 8, and 9 providing pitch control according to an embodiment of the present invention
Figure 14B:
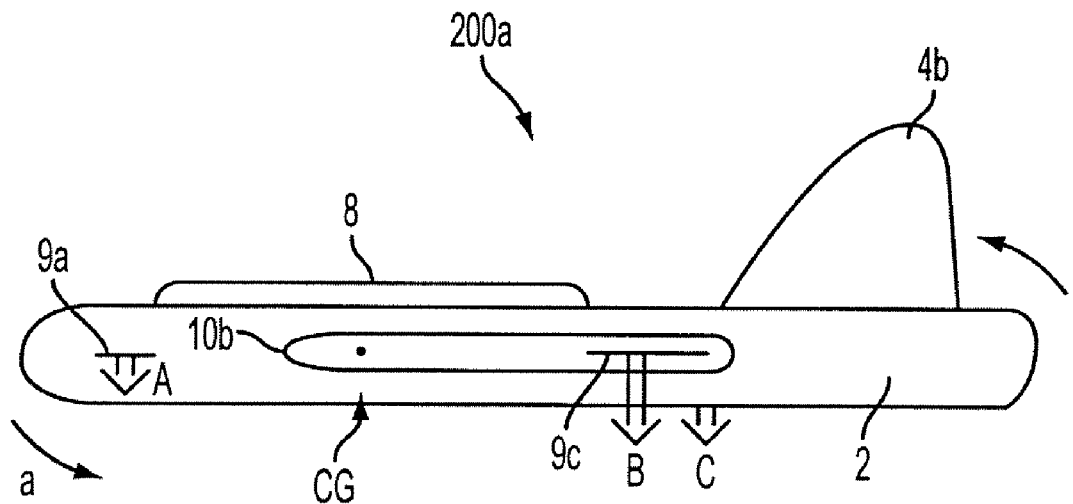

FIGS. 14A and 14B illustrate a side view of the STOL/VTOL A/C 200 shown in FIGS. 2, 8, and 9 providing pitch control according to an embodiment of the present invention. Referring to FIG. 14A, fan engine 9*a* can provide a pitch-up force for STOL/VTOL A/C 200 if thrust control circuit 210 reduces power on fan engines 9*b, c*, and attitude control circuit 208 causes vane 12 associated with fan engine 9*a* to be oriented substantially vertical with the fan engine blades. Then, all the thrust produced by fan engine 9*a* is directed downward, as shown by thrust vector A, and the nose of STOL/VTOL A/C 200 will pitch up in the direction of arrow b. Fan engines 9*b,c* each also provide substantially smaller amounts of thrust, as shown by smaller thrust vectors B, C. Referring to FIG. 14B, fan engines 9*b,c* can provide a pitch-down force for STOL/VTOL A/C 200 if thrust control circuit 210 reduces power to fan engine 9*a* while increasing power to 9*b, c*, and attitude control circuit 208 causes vanes 12 associated with fan engines 9*b, c* to be oriented substantially vertical with the fan engine blades. Then, all the thrust produced by fan engine 9*b,c* is directed downward, as shown by thrust vectors B, C, and the nose of STOL/VTOL A/C 200 will pitch down in the direction of arrow a. Fan engine 9*a* also provides a substantially smaller amount of thrust, as shown by smaller thrust vector A.

FIGS. 15A and 15B illustrate a front view of the STOL/VTOL A/C 200 shown in FIGS. 2, 8, and 9 providing roll control according to an embodiment of the present invention. Referring to FIG. 15A, fan engine 9*b* can provide a left roll force (as seen by a "pilot" sitting in a cockpit the STOL/VTOL A/C 200) for STOL/VTOL A/C 200 if thrust control circuit 210 reduces power to fan engines 9*a,c*, and attitude control circuit 208 causes vane 12 associated with fan engine 9*b* to be oriented substantially vertical with the fan engine blades. Then, all the thrust produced by fan engine 9*b* is directed downward, as shown by thrust vector A, and the right wing 10*a* of STOL/VTOL A/C 200 will roll up in the direction of arrow b, and left wing 10*b* will roll downward. As seen from the viewpoint of the cockpit of STOL/VTOL A/C 200, STOL/VTOL A/C 200 will roll to the left (to the right as seen by the view of FIG. 15A). Referring to FIG. 15B, fan engine 9*c* can provide a right roll force (as seen by a "pilot" sitting in a cockpit the STOL/VTOL A/C 200) for STOL/VTOL A/C 200 if thrust control circuit 210 reduces power to fan engines 9*a,b*, and attitude control circuit 208 causes vane 12 associated with fan engine 9*c* to be oriented substantially vertical with the fan engine blades. Then, all the thrust produced by fan engine 9*c* is directed downward, as shown by thrust vector A, and the left wing 10*b* of STOL/VTOL A/C 200 will roll up in the direction of arrow b, and right wing 10*b* will roll downward. As seen from the viewpoint of the cockpit of STOL/VTOL A/C 200, STOL/VTOL A/C 200 will roll to the right (to the left as seen by a viewer of FIG. 15B).

Figure 16A:
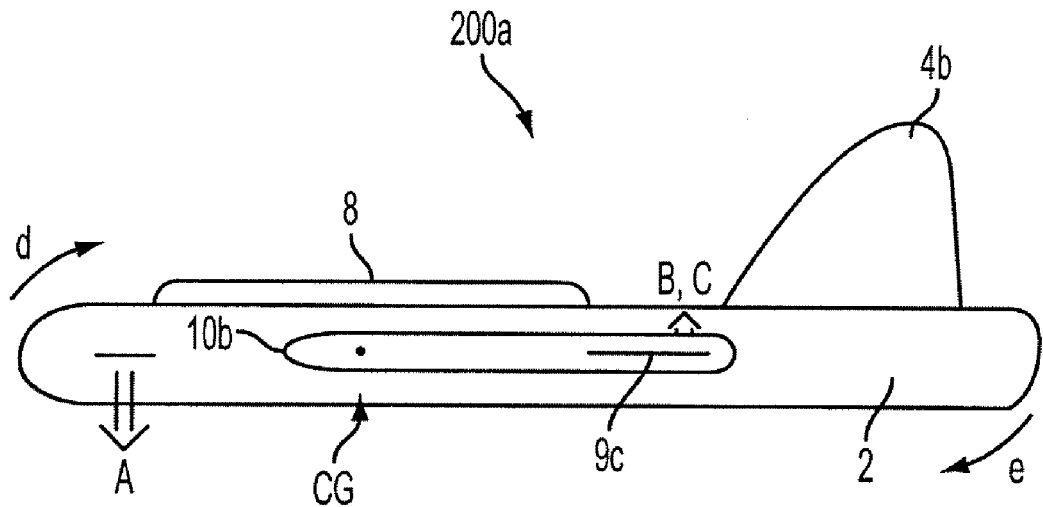
FIGS. 16A and 16B illustrate a side view of the STOL/VTOL A/C shown in FIGS. 2, 8, and 9 providing pitch control according to another embodiment of the present invention
Figure 16B:
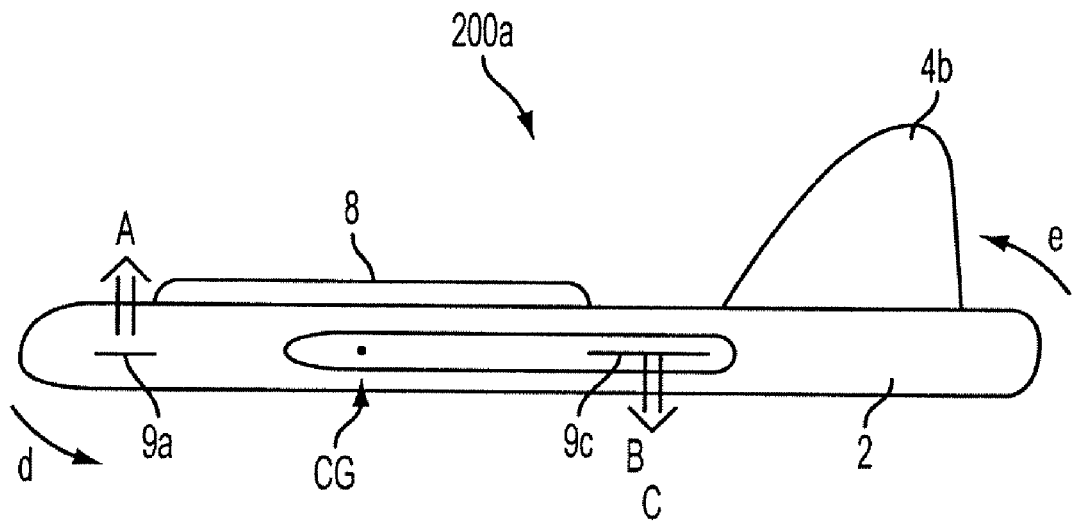

FIGS. 16A and 16B illustrate a side view of STOL/VTOL A/C 200 shown in FIGS. 2, 8, and 9 providing pitch control according to another embodiment of the present invention. In FIGS. 16A and 16B (and FIGS. 17A and 17B), STOL/VTOL A/C 200 has reversible fan engines 9. Although upper vanes 12*b* are not necessarily required to take advantage of reversible fan engines 9*a,b,c*, their presence can assist in producing unique and advantageous roll, pitch and yaw moments on STOL/VTOL A/C 200, as one of ordinary skill in the art of the present invention can appreciate. For the purpose of the discussion in regard to FIGS. 16A, 16B, 17A, and 17B, it shall be presumed that the upper and lower vanes 12*a, b* are present, but are always configured to be substantially vertical in all cases.

Referring to FIG. 16A, fan engine 9*a* provides a first pitch-up force for STOL/VTOL A/C 200, and fan engines 9*b,c* provide a second pitch-up force if thrust control circuit 210 turns on all fan engines 9*a,b,c*, and causes fan engines 9*b,c* to thrust in an opposite direction as fan engines 9*a*. This can be done by reversing direction of rotation or by reversing the pitch angle of the fan blades. The thrust produced by fan engine 9*a* is directed downward, as shown by thrust vector A, the thrust produced by fan engines 9*b,c* is directed upward, as shown by thrust vectors B and C (thrust vector C is not shown; it is on the other side of STOL/VTOL A/C 200), and the nose of STOL/VTOL A/C 200 will pitch up in the direction of arrow d, and the tail of STOL/VTOL A/C 200 will pitch down in the direction of arrow e. Thrust vectors B and C cause the nose of STOL/VTOL A/C 200 to pitch up, and the tail of STOL/VTOL A/C 200 to pitch downward because the thrust vectors push down on the fuselage on an opposite side of the CG point as does thrust vector A.

Referring to FIG. 16B, fan engine 9*a* provides a first pitch-down force for STOL/VTOL A/C 200, and fan engines 9*b,c* provide a second pitch-down force if thrust control circuit 210 turns on all fan engines 9*a,b,c*, and causes fan engines 9*b,c* to produce thrust in an opposite direction as fan engines 9*a*. The thrust produced by fan engine 9*a* is directed upward, as shown by thrust vector A, the thrust produced by fan engines 9*b,c* is directed downward, as shown by thrust vectors B and C (thrust vector C is not shown; it is on the other side of STOL/VTOL A/C 200), and the nose of STOL/VTOL A/C 200 will pitch down in the direction of arrow d, and the tail of STOL/VTOL A/C 200 will pitch up in the direction of arrow e. Thrust vectors B and C cause the nose of STOL/VTOL A/C 200 to pitch down, and the tail of STOL/VTOL A/C 200 to pitch upward because the thrust vectors B, C push down on the fuselage on an opposite side of the CG point as does thrust vector A.

FIGS. 17A and 17B illustrate a side view of the STOL/VTOL A/C shown in FIGS. 2, 8, and 9 providing roll control according to another embodiment of the present invention. Referring to FIG. 17A, fan engine 9b can provide a left roll force (as seen by a "pilot" sitting in a cockpit the STOL/VTOL A/C 200) for STOL/VTOL A/C 200, and fan engine 9c can also provide a left roll force if thrust control circuit 210 shuts off fan engine 9a, and attitude control circuit 208 causes fan engine 9c to produce thrust in a direction opposite that of fan engine 9b. Then, all the thrust produced by fan engine 9b is directed downward, as shown by thrust vector A, all the thrust produced by fan engine 9c is directed upward, as shown by thrust vector B, and the right wing 10a of STOL/VTOL A/C 200 will roll up in the direction of arrow c, and left wing 10b will roll downward in the direction of arrow d. As seen from the viewpoint of the cockpit of STOL/VTOL A/C 200, STOL/VTOL A/C 200 will roll to the left (to the right as seen by the view of FIG. 17A). The roll of STOL/VTOL A/C 200 is about the center of gravity, CG.

Referring to FIG. 17B, fan engine 9b can provide a right roll force (as seen by a "pilot" sitting in a cockpit the STOL/VTOL A/C 200) for STOL/VTOL A/C 200, and fan engine 9c can also provide a right roll force if thrust control circuit 210 shuts off fan engine 9a, and attitude control circuit 208 causes fan engine 9c to produce thrust in a direction opposite that of fan engine 9b. Then, all the thrust produced by fan engine 9b is directed upward, as shown by thrust vector A, all the thrust produced by fan engine 9c is directed downward, as shown by thrust vector B, and the right wing 10a of STOL/VTOL A/C 200 will roll down in the direction of arrow c, and left wing 10b will roll upward in the direction of arrow d. As seen from the viewpoint of the cockpit of STOL/VTOL A/C 200, STOL/VTOL A/C 200 will roll to the right (to the left as seen by the view of FIG. 17B). The roll of STOL/VTOL A/C 200 is about the center of gravity, CG.

Figure 8A:
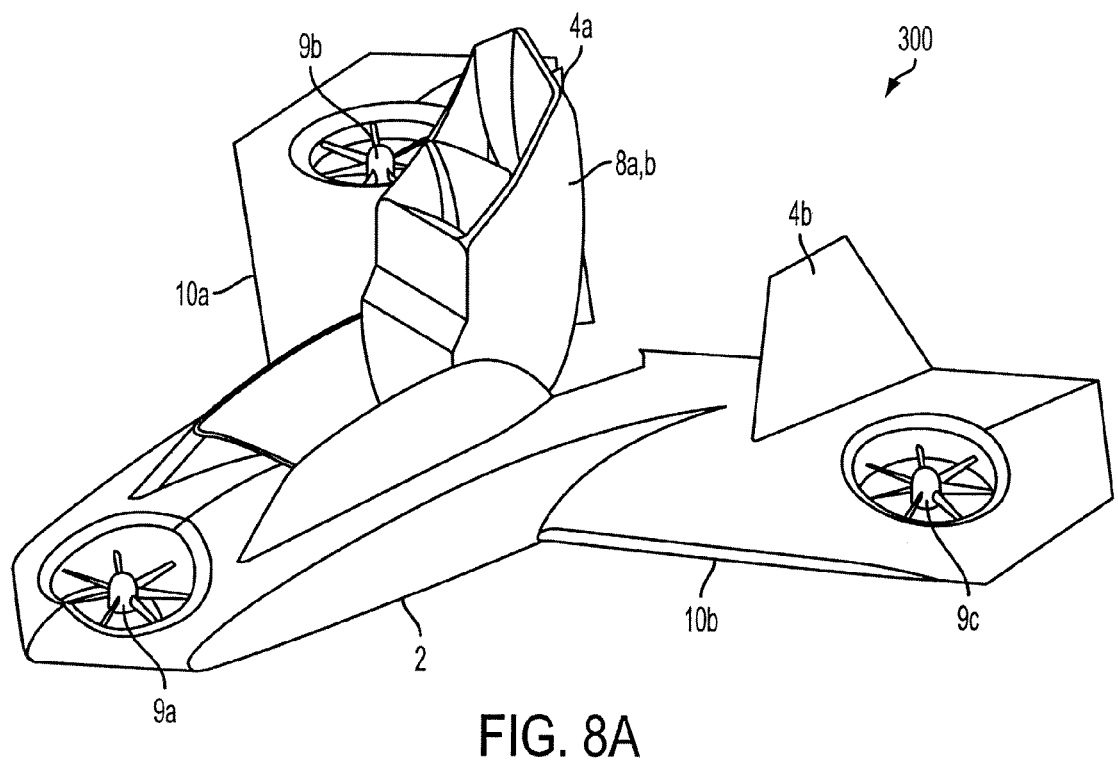
FIGS. 8A-8N illustrate several different views of short take-off and landing/vertical take-off and landing aircraft (STOL/VTOL A/C) according to another embodiment of the present invention
Figure 8B:
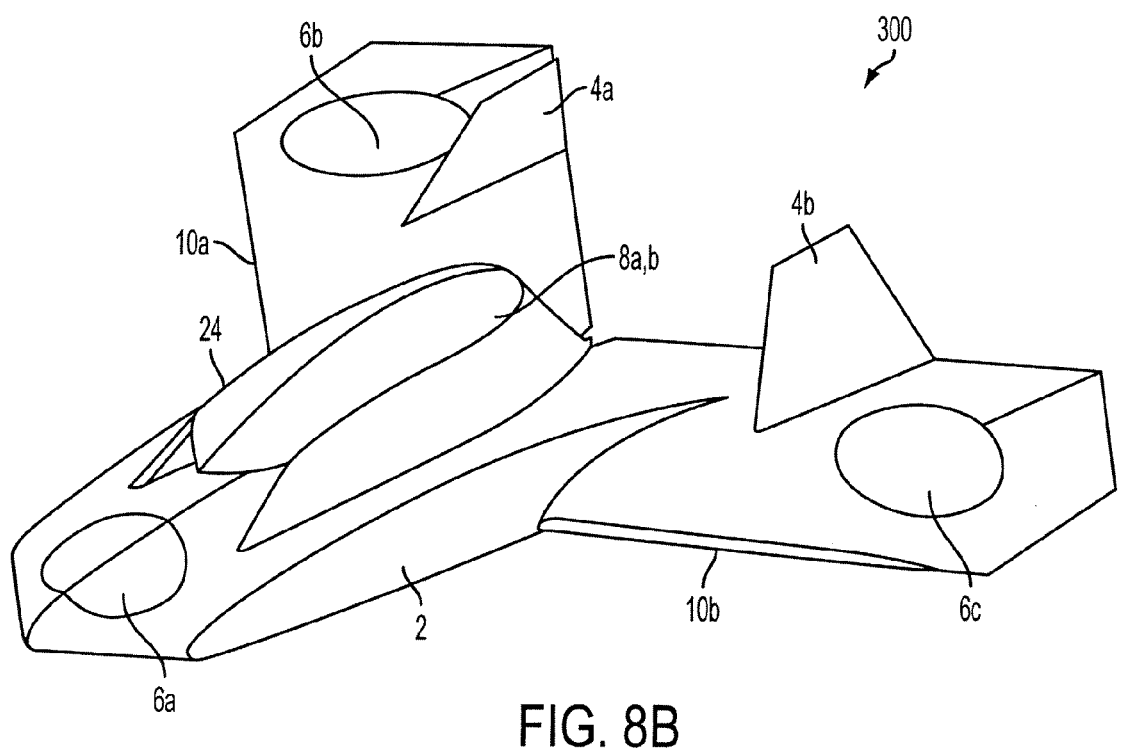
Figure 8C:
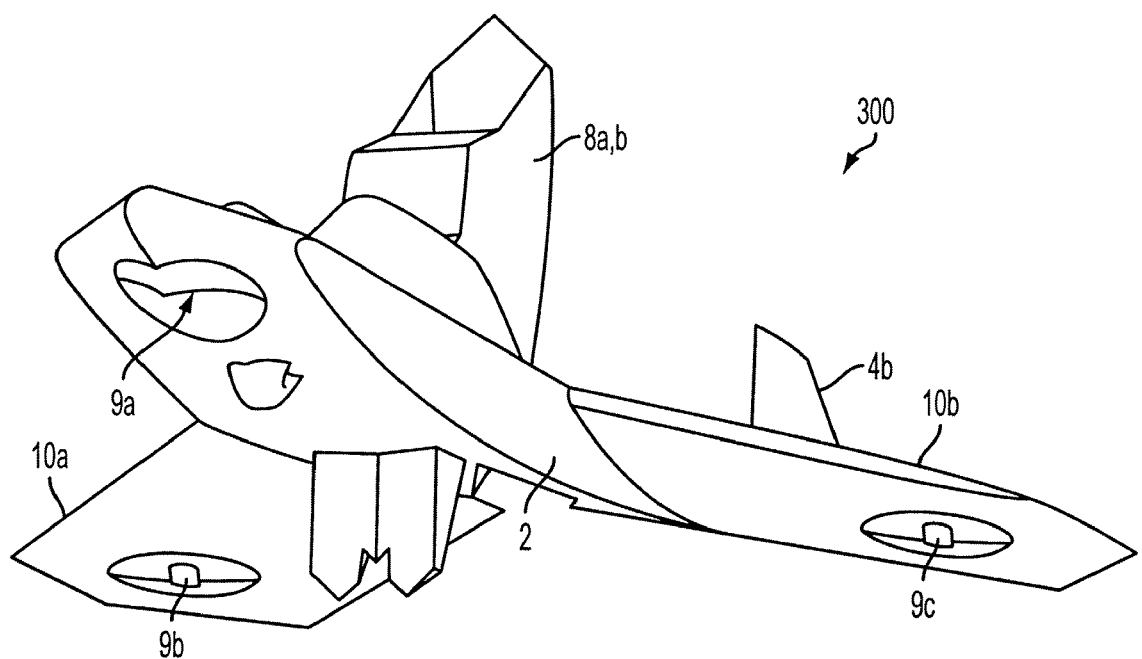
Figure 8D:
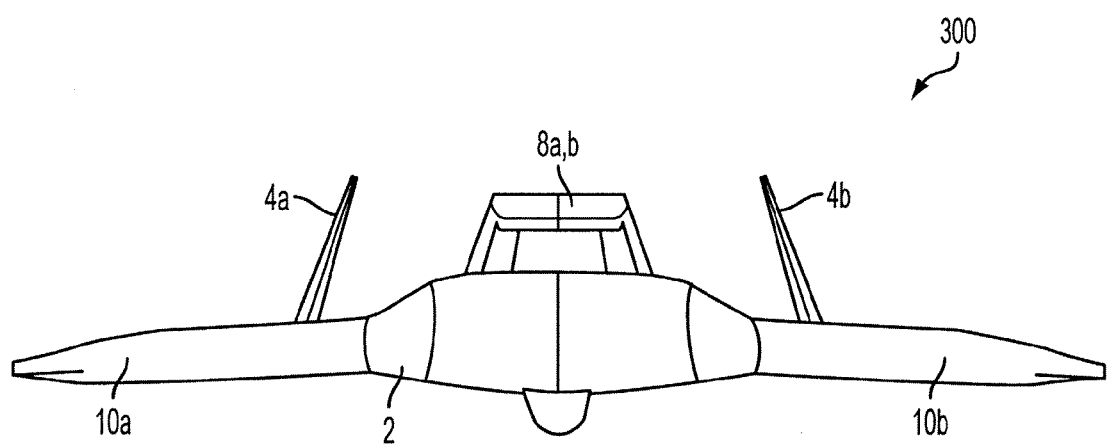
Figure 8E:
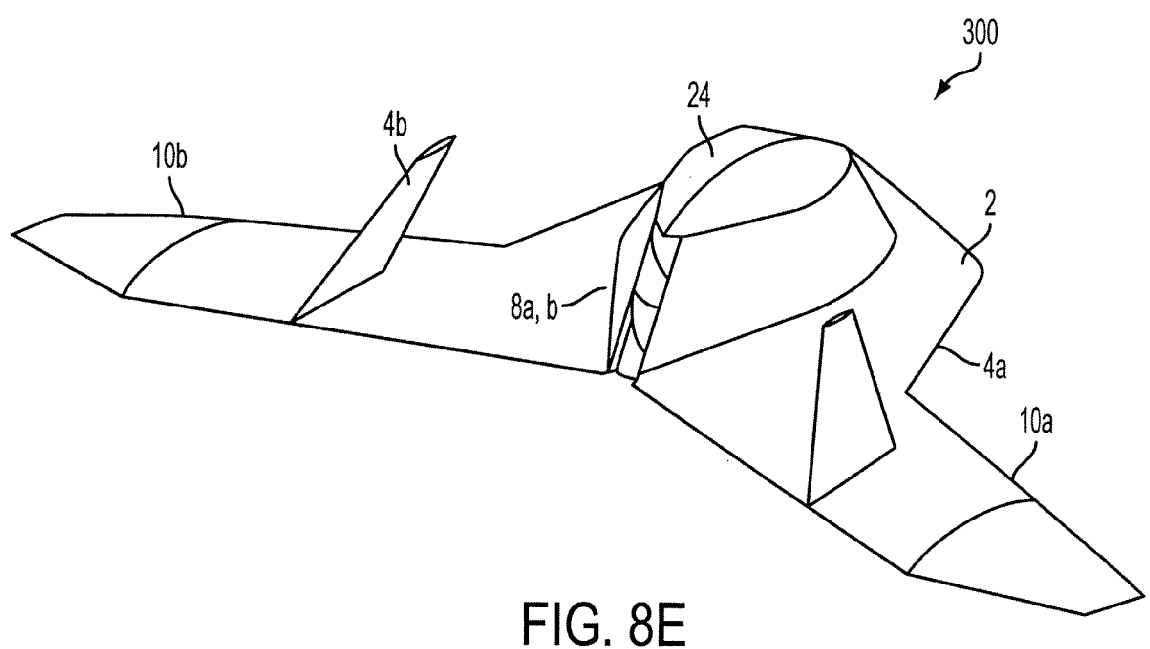
Figure 8F:
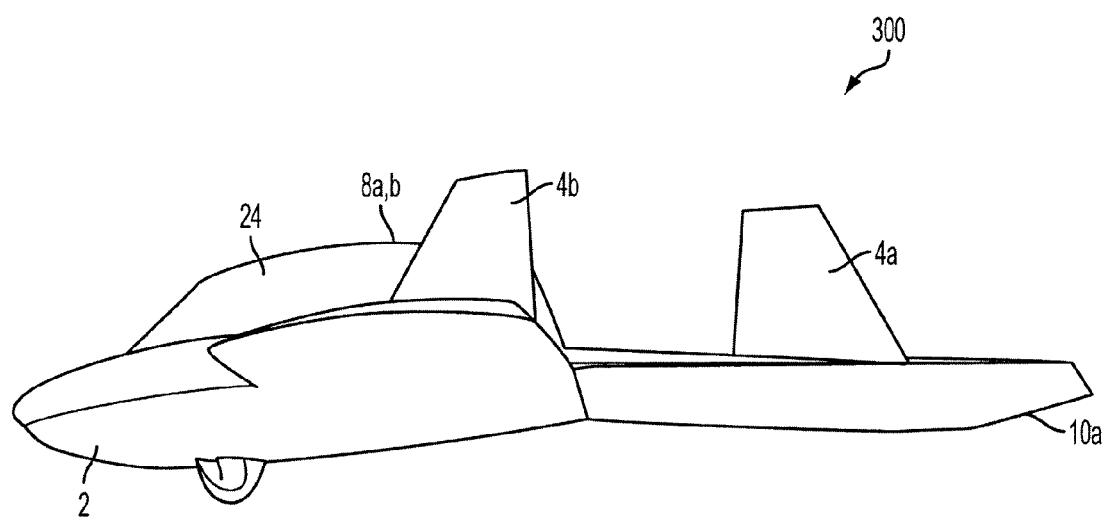
Figure 8G:
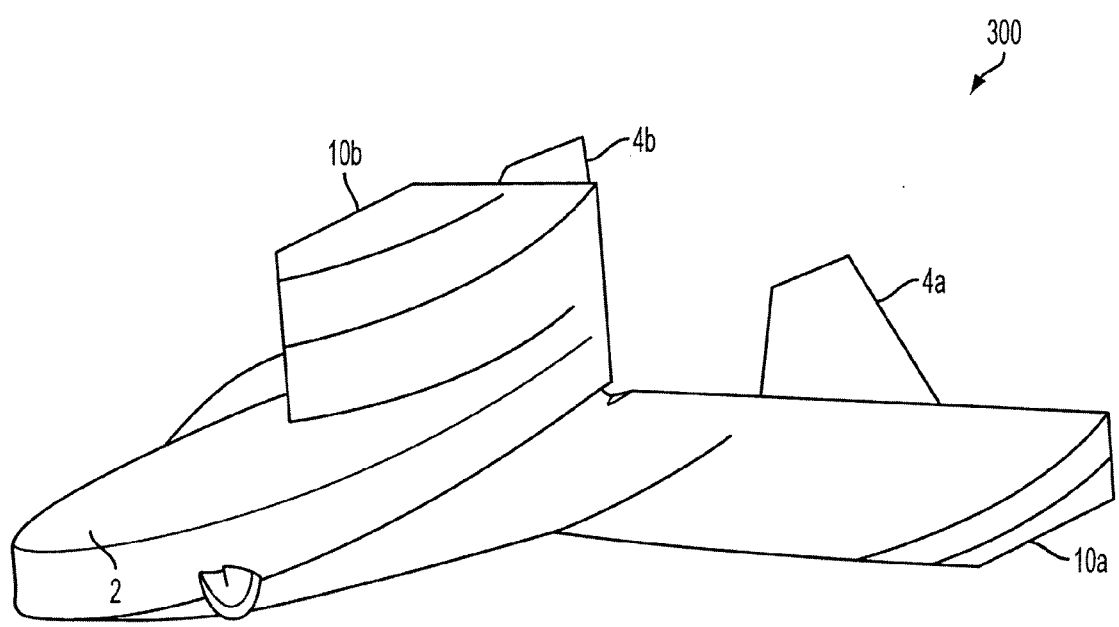
Figure 8H:
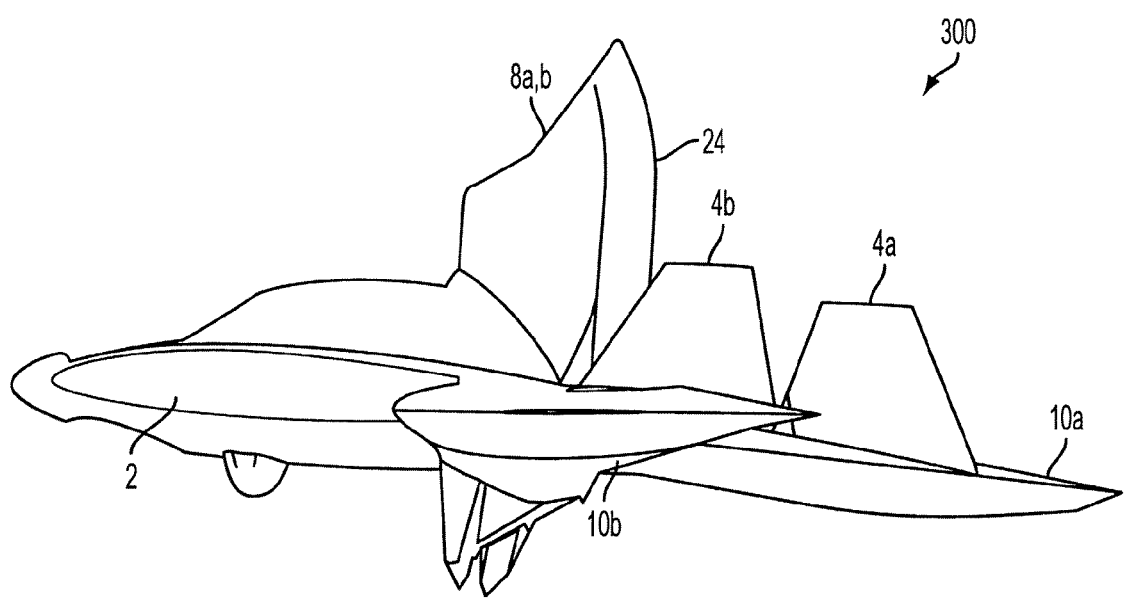
Figure 8I:
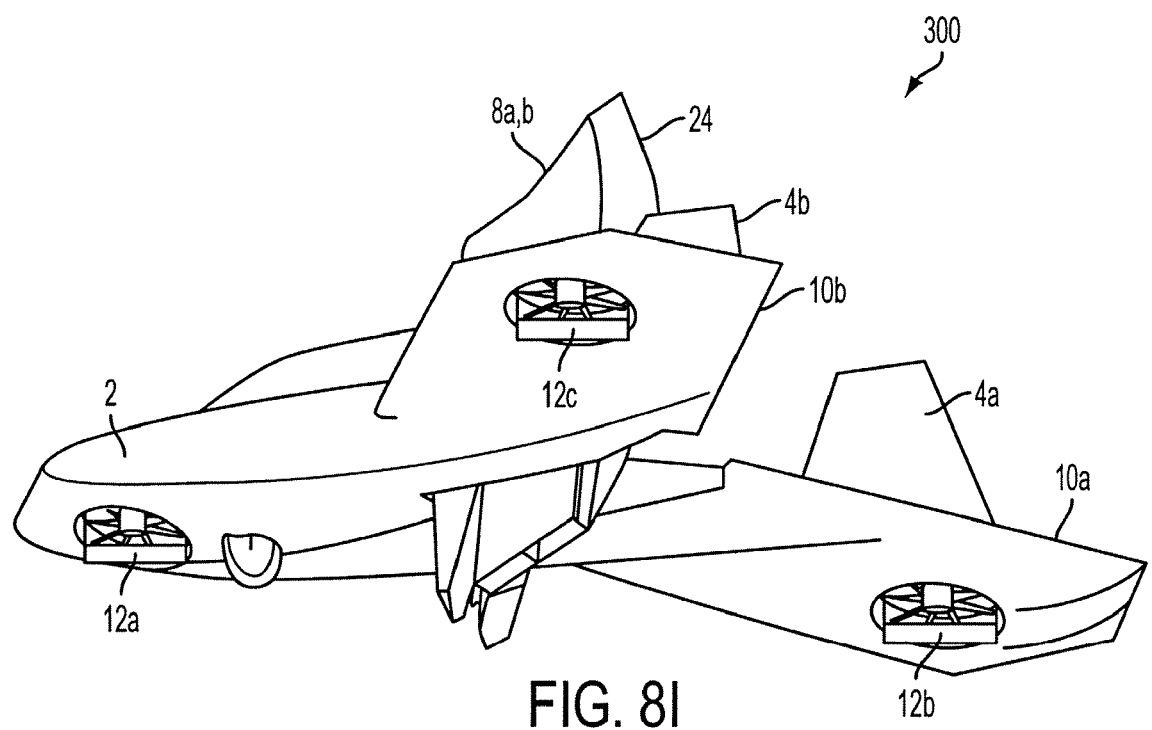
Figure 8J:
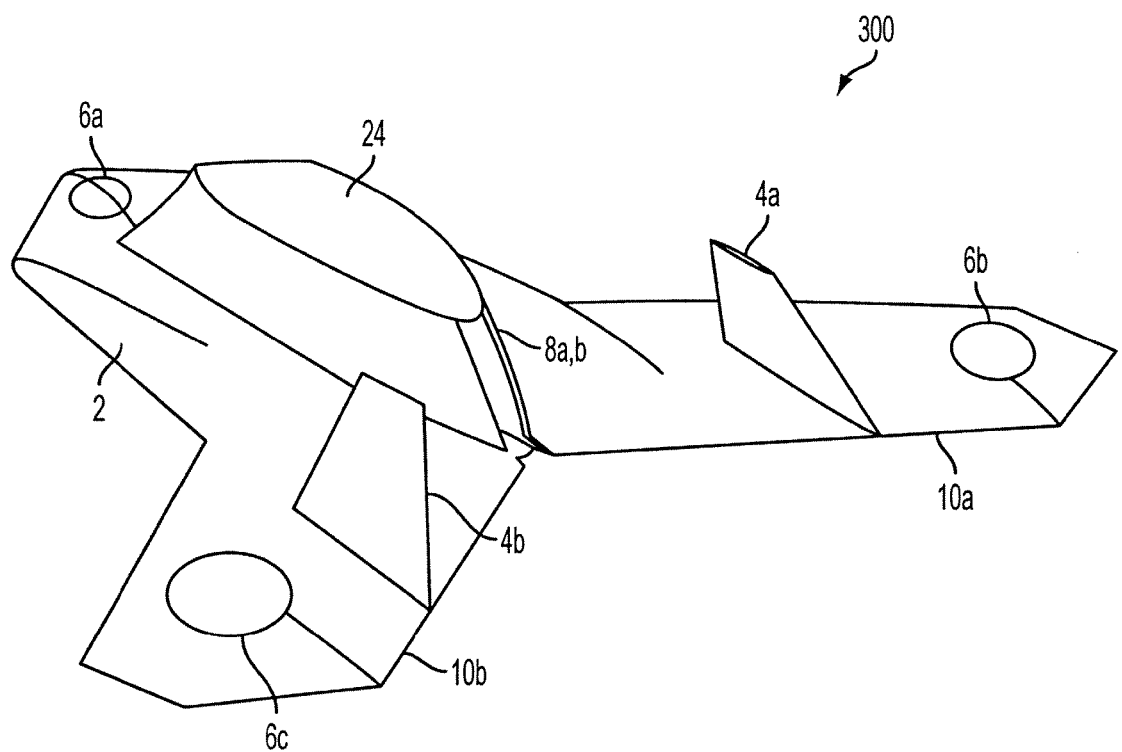
Figure 8K:
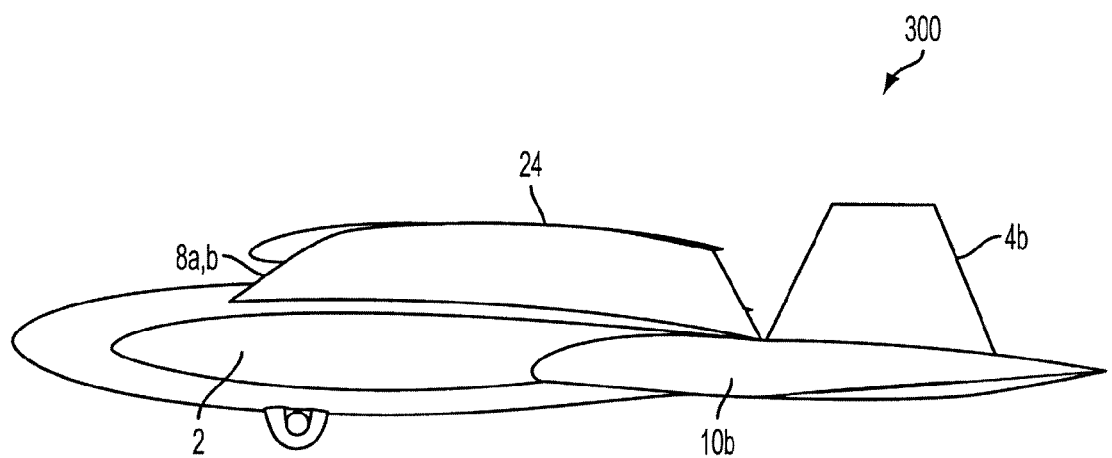
Figure 8L:
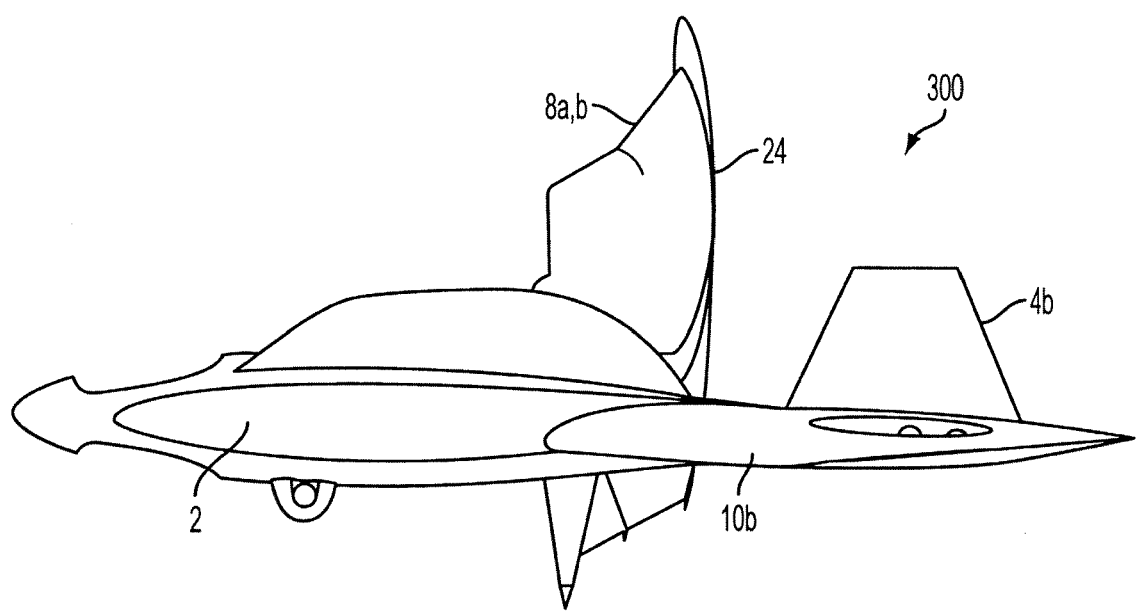
Figure 8M:
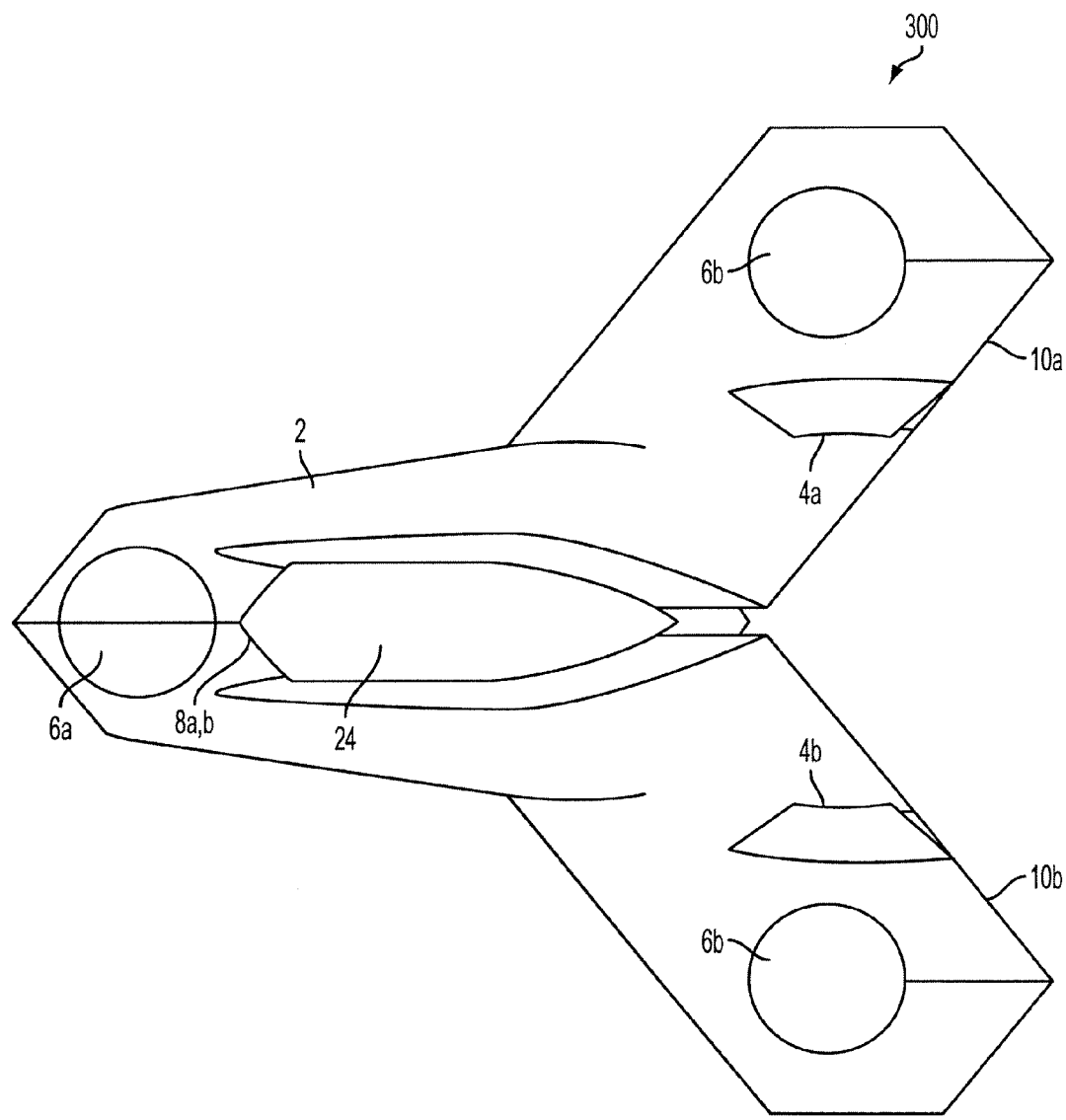
Figure 8N:
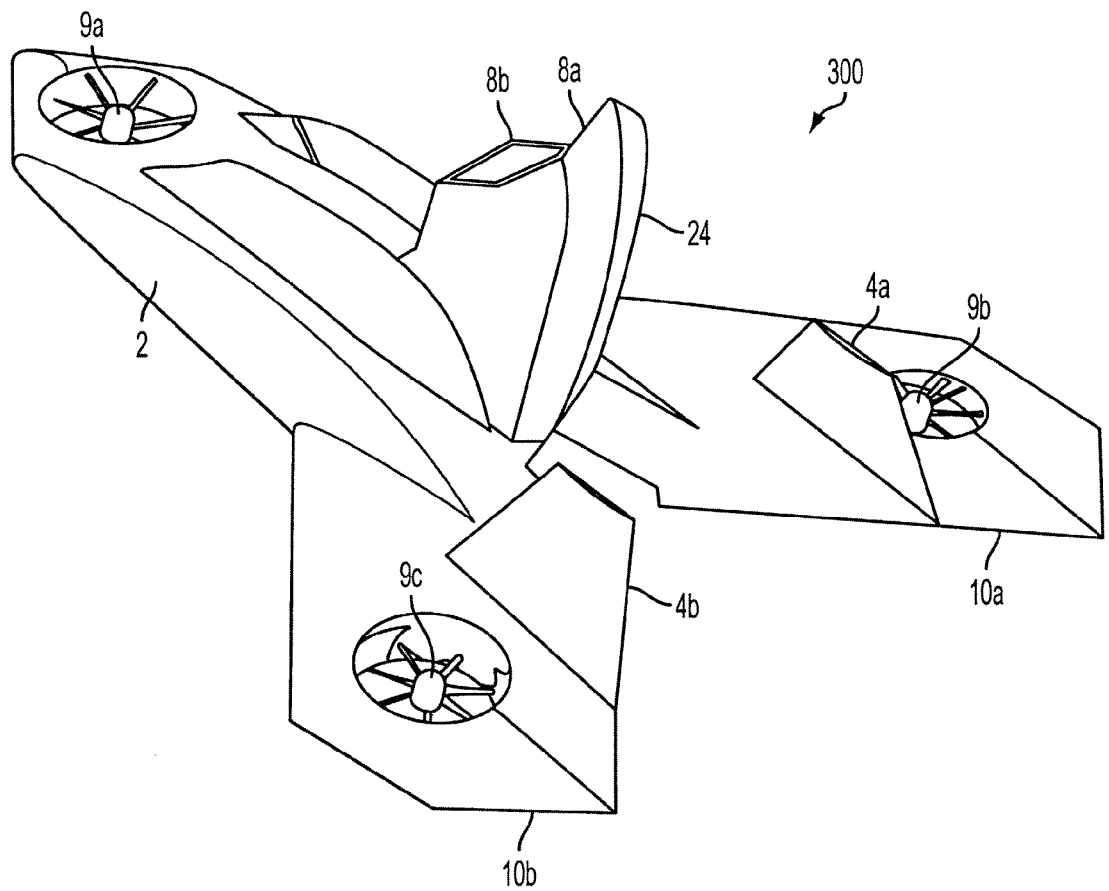

FIGS. 8A-8N illustrate several different views of short take-off and landing/vertical take-off and landing aircraft (STOL/VTOL A/C) 300 according to another embodiment of the present invention. STOL/VTOL A/C 300 is substantially the same as STOL/VTOL A/C 200, except that engine 8 has been replaced by engines 8a,b. Engine 8a represents an upper, low speed engine, and engine 8b represents a lower, high speed engine. The configuration of engines 8a,b provides additional features and benefits more fully described in co-pending U.S. Non-provisional patent application "VARIABLE ENGINE INLET FOR VTOL AIRCRAFT" by Robert Parks, filed concurrently with the present application on Dec. 22, 2005, and commonly assigned to Aurora Inc., of Manassas, Va.

Figure 9A:
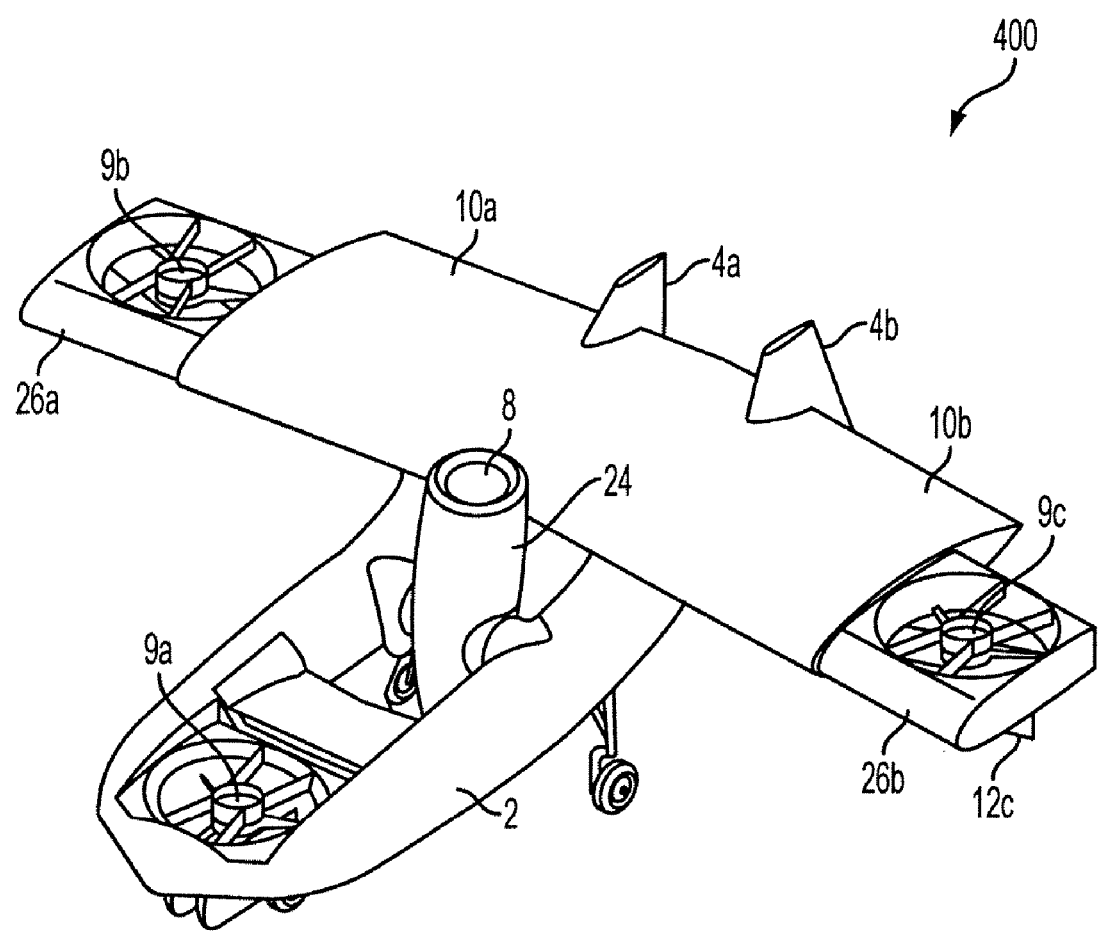
FIGS. 9A-9H illustrate several different views of short take-off and landing/vertical take-off and landing aircraft (STOL/VTOL A/C) according to still another embodiment of the present invention
Figure 9B:
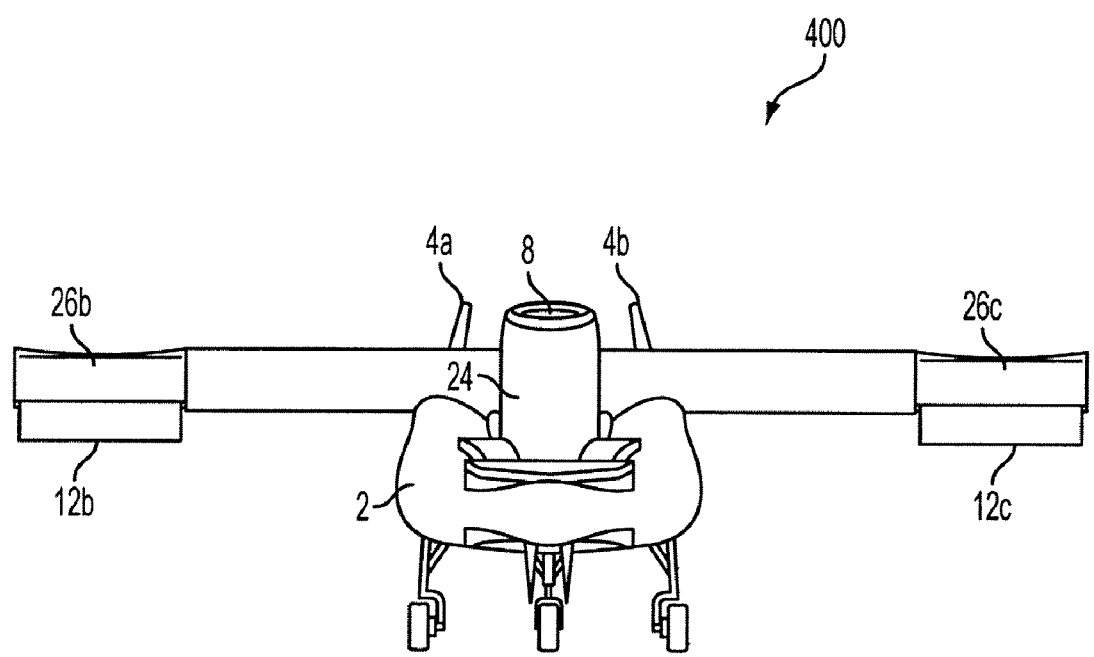
Figure 9C:
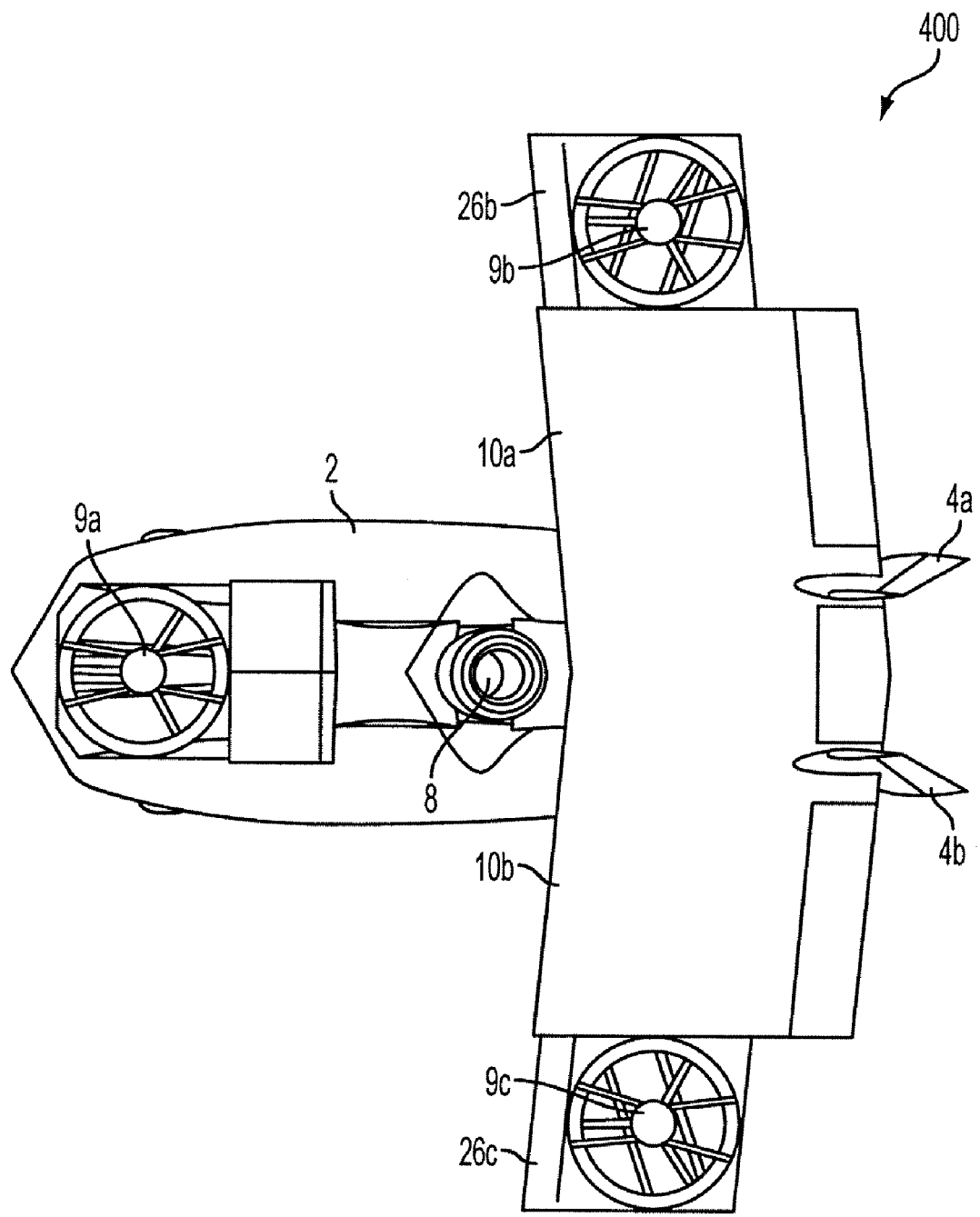
Figure 9D:
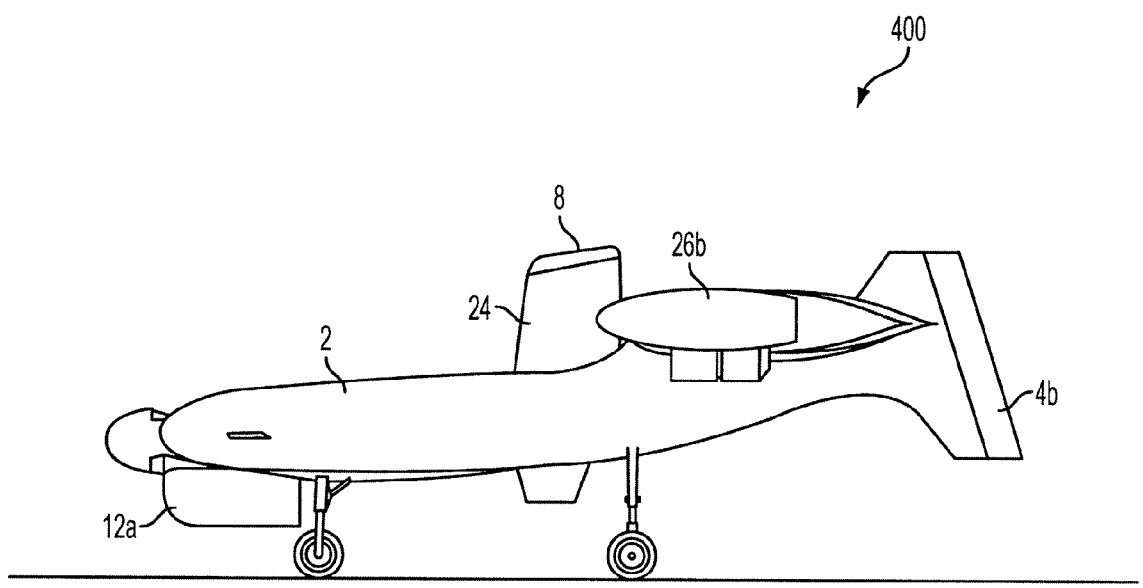
Figure 9E:
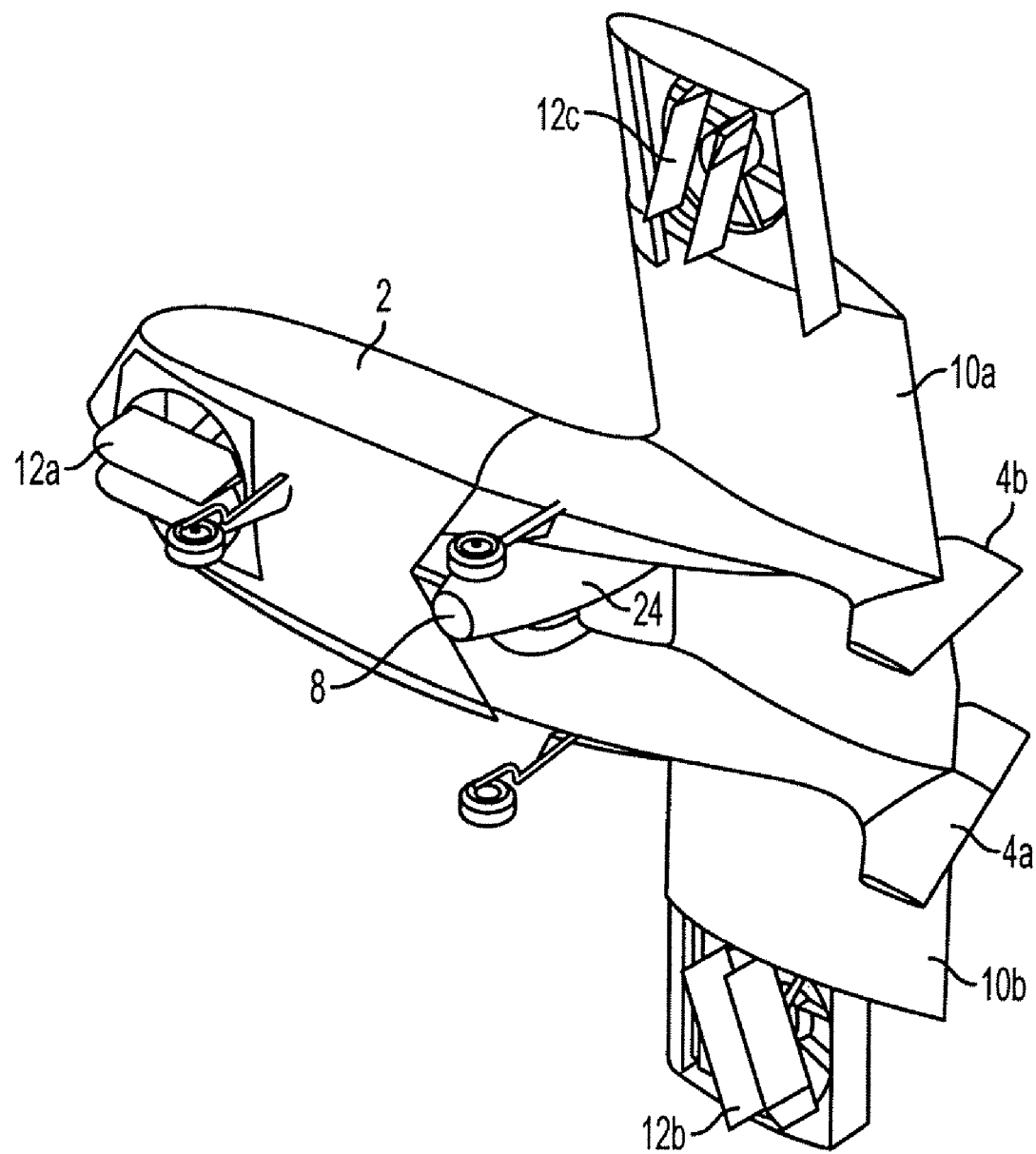
Figure 9F:
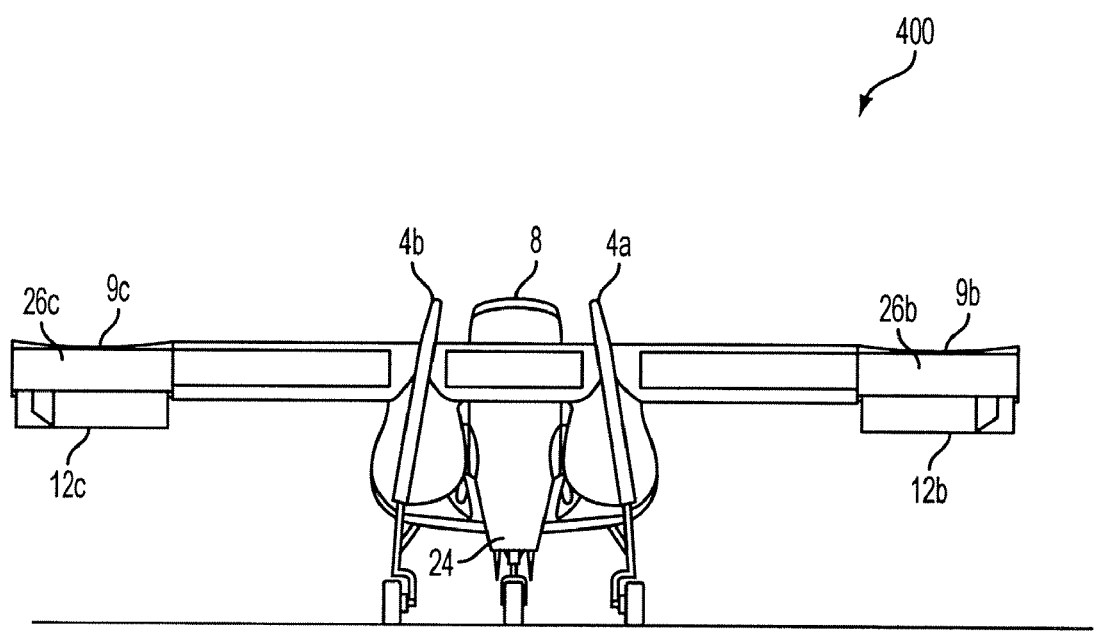
Figure 9G:
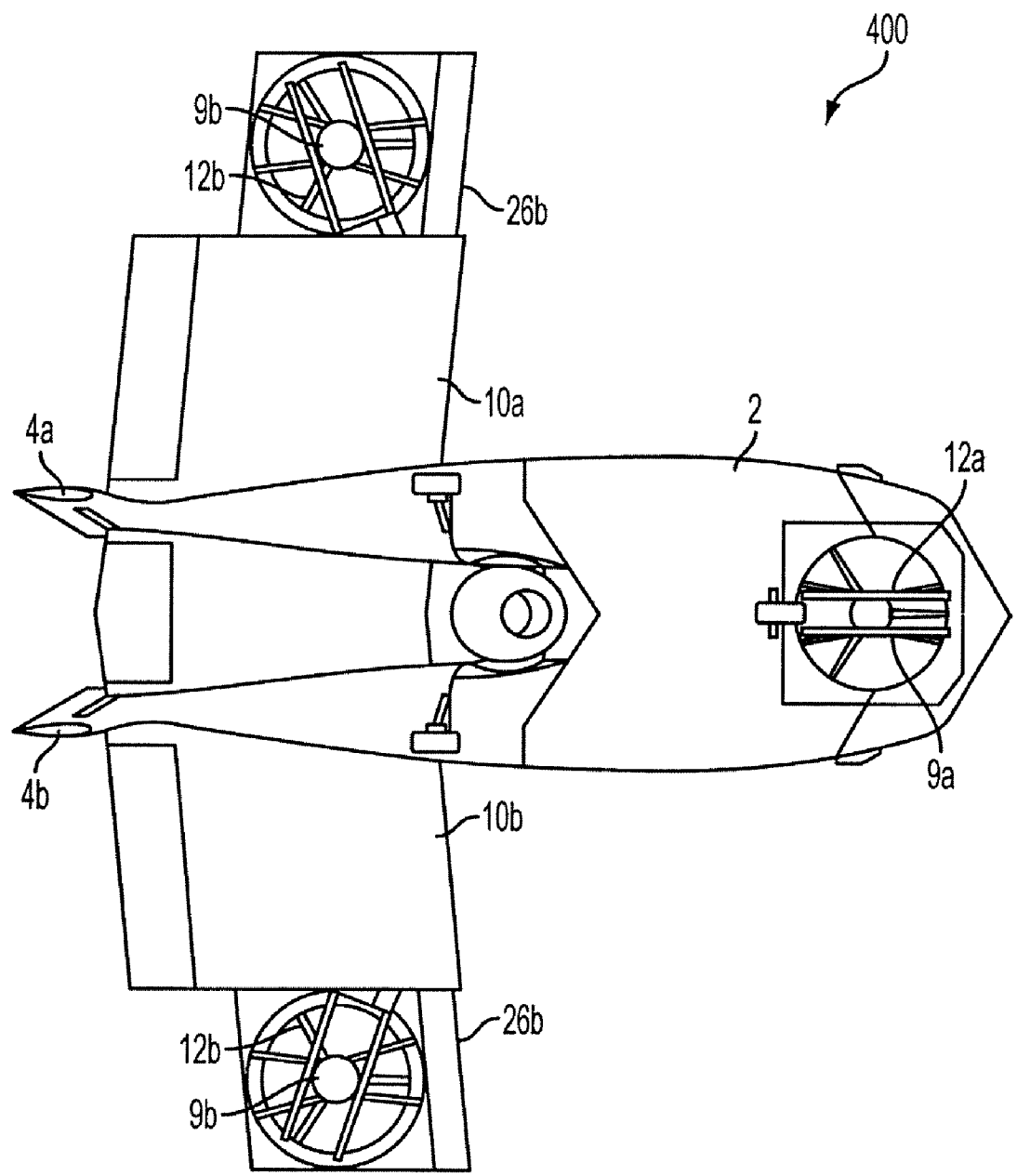
Figure 9H:
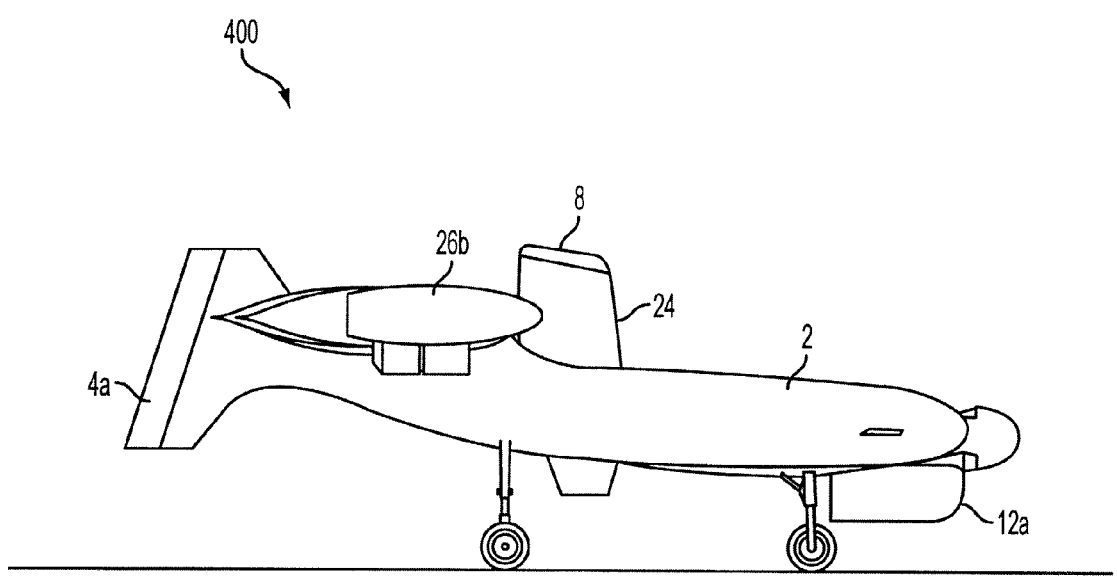

FIGS. 9A-9H illustrate several different views of short take-off and landing/vertical take-off and landing aircraft (STOL/VTOL A/C) 400 according to still another embodiment of the present invention. STOL/VTOL A/C 400 is substantially identical to STOL/VTOL A/C 200, 300, but does have some different features. For example, engine 8 is of a different configuration. Also, fan engines 9b,c have been placed on electric fan engine rolling drawers (rolling drawers) 26a,b that can be hidden or recessed within wings 10a,b during horizontal flight, and extended (as shown in FIG. 9A) for take-off, hovering, and landing. Fan engine 9a, however, uses fan door 6a, as used in STOL/VTOL A/C 200, 300.

Placing fan engines 9b,c on rolling drawers 26a,b provides several unique benefits to the performance characteristics of STOL/VTOL A/C 400. For example, according to an exemplary embodiment of the present invention, fan doors 26a,b provide additional wing area to provide additional lift during shortened take-off conditions. Rolling doors also require very little force to extend or retract into wings 10a,b. Fan doors 6a,b,c however, require a substantially greater amount of force to keep closed during high speed flight. That is because when the wings are generating lift at high speeds, a great deal of suction is generated on the wing surfaces. This suction force tries to open fan doors 6a,b,c. The effect is much more noticeable and pronounced on fan doors 6b,c, because wings 10a,b generate a substantially greater amount of lift than does the front nose section of STOL/VTOL A/C 200, 300. Counter-acting this suction force requires that the motors that close fan doors 6b,c be larger than they would have to be to close the fan doors 6b,c if only their size and weight on the ground in a static condition would dictate. This is added weight that is not necessary in the configuration of rolling drawers 26a,b. All the weight of fan engines 9b,c and the force created by moving air is taken up by the extension bars that make up the rolling drawers 26a,b, and they slide easily because of bearing assemblies, as is well known to those of ordinary skill in the art of the present invention.

The use of fan engines 9a,b,c in a short take-off and landing mode will now be discussed. Short take-off and landing refers to the scenario in which the STOL/VTOL A/C 200 launches in a conventional way, that is, accelerating down a runway or landing strip, until enough speed has been achieved to produce enough lift over wings 10a,b to allow STOL/VTOL A/C 200 to become airborne. Because of fan engines 9a,b,c, STOL/VTOL A/C 200 has at least two advantages over an aircraft with substantially the same size, weight and design, but no fan engines 9a,b,c. A first advantage is that STOL/VTOL A/C 200 can take-off substantially sooner than a similarly configured aircraft without fan engines 9a,b,c. The take-off run can be reduced by as much as about 50-60%. Or, if there is sufficient runway length (e.g., 500 feet for an aircraft without fan engines 9a,b,c), STOL/VTOL A/C 200 can be loaded with about 30-40% more weight and still take-off in that same length of runway. An STOL/VTOL A/C according to an embodiment of the present invention can achieve this shortened take-off run, or carry more weight in substantially the same take-off distance, through its use of fan engines 9a,b,c and the lift they produce. An increase in weight carrying capability of 30-40% is a substantial improvement in the amount of load an aircraft can carry.

Figure 10:
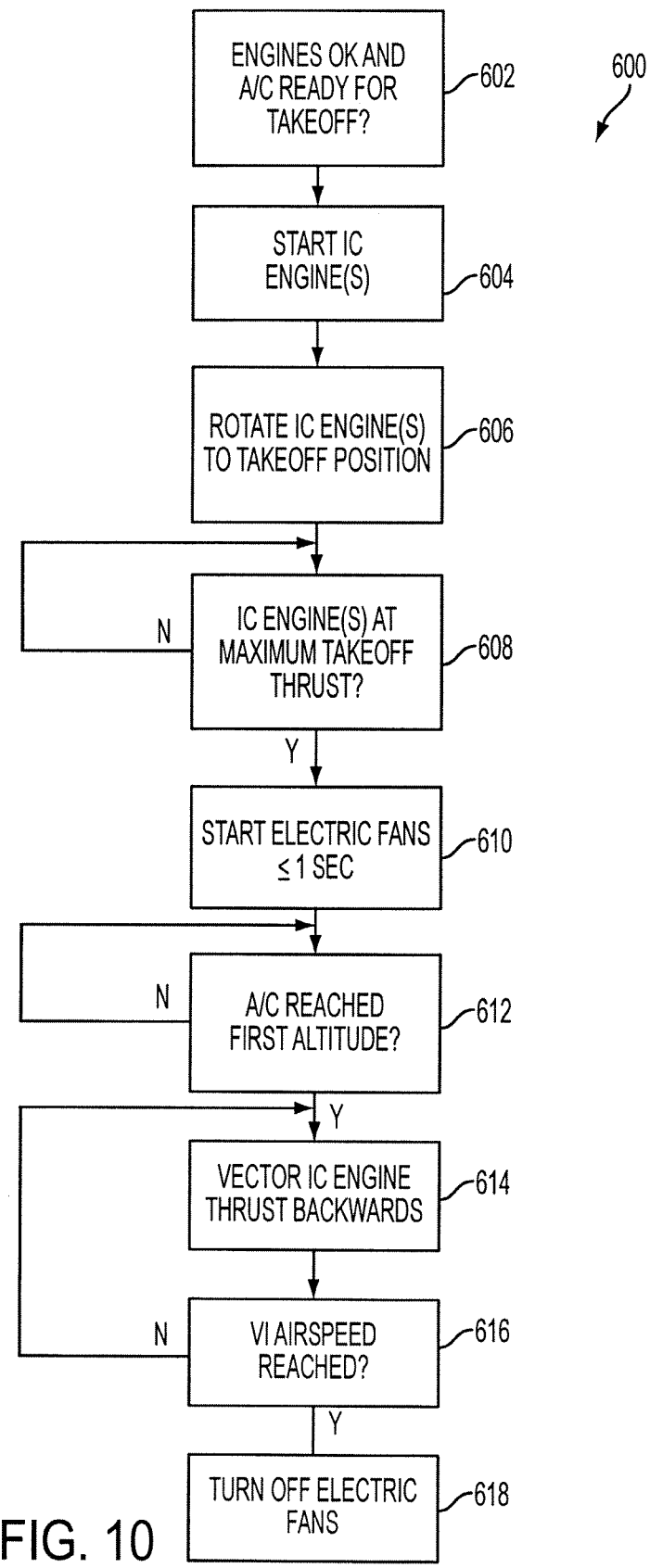
FIG. 10 is a flow diagram of a method for operating a STOL/VTOL A/C as shown in FIGS. 2, 8, and 9 according to another embodiment of the present invention

FIG. 10 is a flow diagram of a method 600 for operating STOL/VTOL A/C 200, 300, 400 as shown in FIGS. 2, 8, and 9 according to another embodiment of the present invention. In regard to the discussion of method 600, reference shall be made to STOL/VTOL A/C 200, although, as one of ordinary skill in the art can appreciate, operation of method 600 applies equally to all the various embodiments of the present invention for STOL/VTOL A/C discussed herein. Method 600 represents a method for vertical take-off of STOL/VTOL A/C 200 according to an embodiment of the present invention. FIGS. 11A-11E illustrate several side views of the STOL/VTOL A/C 200 during take-off as discussed in regard to the method of FIG. 10, and reference shall be made to FIGS. 11A-11E throughout the discussion of method 600.

Figure 11A:
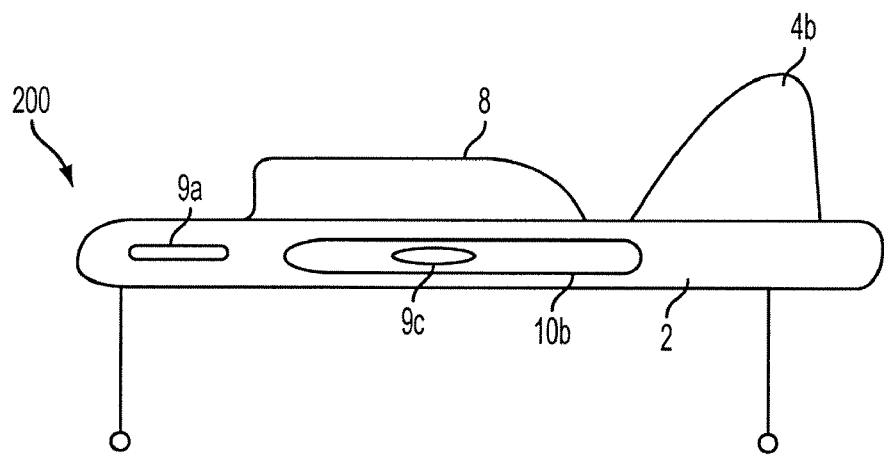
Figure 11B:
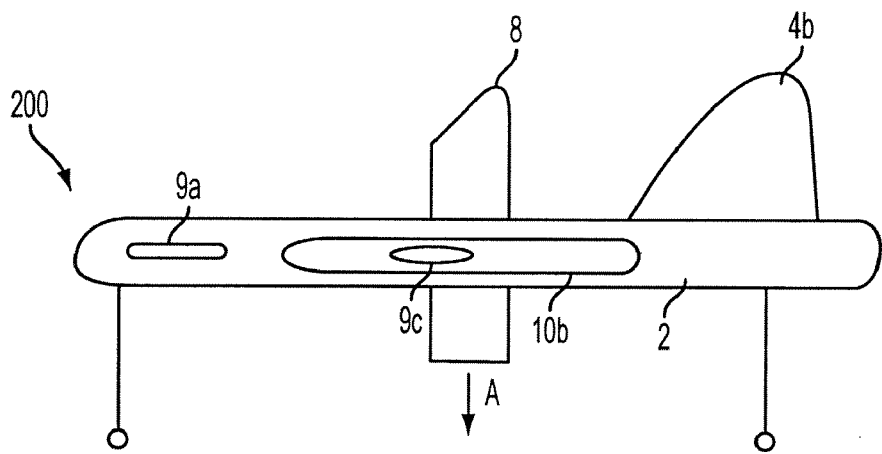

Method 600 beings with step 602 in which the main flight control computer 206 verifies that engine 8 and fan engines 9a,b,c are ready for take-off (see FIG. 11A). In step 604, internal combustion engine 8 is started. Engine 8 can take approximately 50-60 seconds to get up to take-off power levels, although from a cold start, engine 8 would preferably be allowed to stabilize at normal operating temperatures. As one of ordinary skill in the art of the present invention can appreciate, gas turbine engines operate at very high temperatures, and the thermal stress placed on components of the engines is significant, and must be taken into consideration.

Figure 11C:
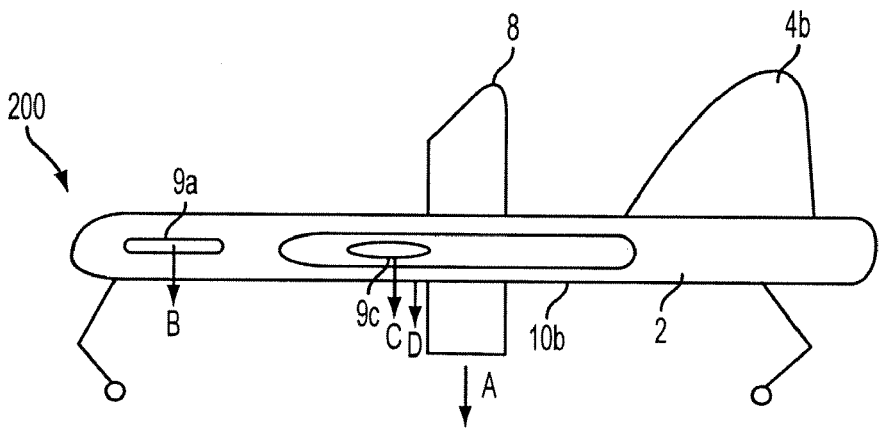

Even from a warm engine starting condition, however, it can take approximately between 50 and 60 seconds for engine 8 to spool up to take-off power levels. During that spool up period, engine 8 is rotated or tilted to its proper take-off attitude of configuration. The places engine 8 in a substantially vertical configuration (see FIG. 11B). Following placement of engine 8 in its take-off configuration, method 600 determines whether engine 8 is at maximum take-off power. Once this is achieved ("Yes" path from decision step 608), method 600 starts fan engines 9a,b,c. Fan engines 9a,b,c take a substantially shorter amount of time to bring up to maximum operating power. According to an exemplary embodiment of the present invention, this can be less than approximately 1 second. Following start up and attainment of maximum thrust of fan engines 9a,b,c, STOL/VTOL A/C 200 lifts off from the ground or launching vehicle. As can be seen in FIG. 11C, engine 8 and fan engines 9a,b,c of STOL/VTOL A/C 200 are generating a maximum amount of thrust (shown by thrust vectors A, B, C, and D).

In decision step 612, method 600 ascertains whether a first, predetermined altitude has been reached. It keeps checking the altitude until this first altitude is reached. The first altitude is a minimum safe altitude wherein engine 8 can start to be tilted backward to provide forward or horizontal thrust. This moves STOL/VTOL A/C 200 forward. This tilting should not be accomplished too rapidly, as insufficient lift might be generated if the STOL/VTOL A/C 200 is not moving forward fast enough. Of course, if the thrust provided by engine 8 is sufficient, engine tilting can be accomplished relatively fast, as it will propel STOL/VTOL A/C 200 forward very quickly. FIG. 11D shows STOL/VTOL A/C 200 as it begins to move forward and air flows over wings 10a,b, as represented by air currents 22a,b. Moving air over wings 10a,b generates lift, as is well known to those of ordinary skill in the art of the present invention.

As STOL/VTOL A/C 200 begins to move forward, method 600 monitors the airspeed in decision step 616. Once a safe forward airspeed $V_1$ has been reached (i.e., an airspeed that can sustain flight through the generation of lift by wings 10a, b; "Yes" path from decision step 616), method 600 turns off fan engines 618. FIG. 11E shows STOL/VTOL A/C 200 moving forward with engine 8 in a substantially horizontal configuration, fan engines 9a,b,c off and either covered (STOL/VTOL A/C 200, 300) or with rolling drawers 26a,b retracted (STOL/VTOL A/C 400).

The embodiments of the present invention pertain to a system and method for operating a STOL/VTOL A/C 200, 300, 400 as discussed and described herein. As one of ordinary skill in the art can appreciate, however, the embodiments of the present invention can and do apply to other types of aircraft including, but not limited to, unmanned aerial vehicles or UAVs. According to an exemplary embodiment of the present invention, STOL/VTOL A/C 200, 300, 400 can be configured to operate as an unmanned aerial vehicle (UAV). Unmanned aerial vehicles (UAVs) have substantially the same components as typical manned aerial vehicles but generally are much smaller than their human operated counterparts. It is well known by those of ordinary skill in the art, that a typical UAV is not simply a remotely controlled version of a human driven aircraft. The chief difference lies in the purpose of design. Typically, human drive aircraft are designed for particular missions, and include many functions that enable its operators to survive and perform their mission. For example, a human driven aircraft, to operate at significant lengths of time at or above about 14,000 feet above sea level, must be pressurized or contain air/oxygen supplies for the operators (operators can include pilot(s), flight engineers, navigators, radar/weapon systems officers, among others). This is not the case with UAVs. There is no absolute need for pressurization nor oxygen/air supplies. Another significant difference is that the flight envelope that the UAV performs in can be much more severe. A typical human can only withstand so many g-forces; this, again, is not the case with UAVs. The only constraint in that regard is the strength of the airframe and the ability of the internal components to withstand extreme forces of acceleration. By way of example, while a typical fighter aircraft can be designed to withstand many g-forces, the human body can only withstand about 10-12. Often times, aircraft will have built-in control systems that will not allow the aircraft to exceed the human tolerance level.

The conventional UAV 100 has many of the same components as a conventional human crewed aircraft. These include a fuselage, wings, vertical and horizontal stabilizers, landing gear, flight control surfaces, a propulsion system and avionics. Flight control surfaces include ailerons, flaps, elevators, and a rudder. Other types of UAVs can include canards. Avionics include communication systems, propulsion system monitoring equipment, and electronics that controls the flight control surfaces in response to pre-programmed commands and/or remotely received commands. Of course, UAVs are generally designed to perform one or more specific missions, so the UAVs will also include a payload that can include weapons and/or monitoring equipment. Monitoring equipment can include electronic monitoring systems (radar, electronic eavesdropping communications systems, among other types), video surveillance systems, laser and/or infra-red surveillance systems, laser detections systems, and electronic communications jamming equipment. These are but a few very generalized types of payloads that UAVs can accommodate, and some UAVs can include one or more of these types of systems.

As can be readily appreciated, UAVs have significant advantages over human piloted aircraft in many respects. First, there are generally smaller, less expensive and therefore more expendable than human driven aircraft. Because of their smaller size —sometimes many orders of magnitude smaller size—UAVs can operate from areas that ordinary human driven aircraft cannot. Because of their size, UAVs will be more difficult to detect, will have a much smaller turn radius, and therefore can be much more survivable in certain situations. With the current state of technology, UAVs can be remotely controlled from around the world (via satellite), and global positioning system tracking devices can pinpoint their locations within meters. UAVs can deliver some of the same ordinance that their well known human driven counterparts can, albeit on a smaller scale and quantity.

FIGS. 12A-E illustrate a take-off scenario for the STOL/VTOL A/C shown in FIGS. 2, 8, and 9 configured as a UAV according to an embodiment of the present invention. STOL/VTOL A/C 400 in the form of a UAV will be used to describe a take-off scenario as shown in FIGS. 12A-12E. In FIG. 12A, STOL/VTOL A/C 400 is at beginning to take-off from either the ground or a STOL/VTOL A/C launch vehicle. Note that engine 8 is substantially vertical, and fan engines 9a,b,c are producing maximum thrust, with their respective vanes 12 substantial vertical as well.

In FIG. 12B, engine 8 is tilted at about a 45° angle so that its thrust is forcing STOL/VTOL A/C 400 to move forwards. Also, vanes 12 of fan engines 9b,c may be angled such that thrust from these fan engines is directed towards the tail assisting in moving STOL/VTOL A/C 400 forward. This forward motion will force air to move over wings 10a,b, thereby creating lift. In FIG. 12C, engine 8 has completely tilted to its substantially horizontal position and is substantially horizontal with fuselage 2 of STOL/VTOL A/C 400. In FIG. 12D, the landing gear of STOL/VTOL A/C 400 has retracted as airspeed begins to increase. Following FIG. 12D, STOL/VTOL A/C 400 rolls to its right (as seen from the cockpit, looking at the nose of the aircraft). This rolling motion can be accomplished several different ways. Roll can be induced by aileron action alone, or in combination with thrust produced by one or more of fan engines 9b,c, as discussed above in regard to FIGS. 15 and 17.

STOL/VTOL A/C 400 rolls 180° so that the bottom of STOL/VTOL A/C 400 is now facing up, and the top of STOL/VTOL A/C 400 is facing down. The advantage this provides is that engine 8 is now substantially hidden by wings 10a,b. The rear of engine 8 is hidden from below by wings 10a,b, and the exhaust from engine 8 first travels over the bottom of wings 10a,b as it leaves engine 8. This means that a substantially greater amount of the heat produced by engine 8 is hidden from ground observer, thereby reducing the infra-red signature of STOL/VTOL A/C 400. Furthermore, inverting STOL/VTOL A/C 400 in this manner can also reduce its radar cross section, or RCS. The RCS of the STOL/VTOL A/C 400 is reduced because a portion of engine 8 is hidden behind wings 10a, b.

Figure 13:
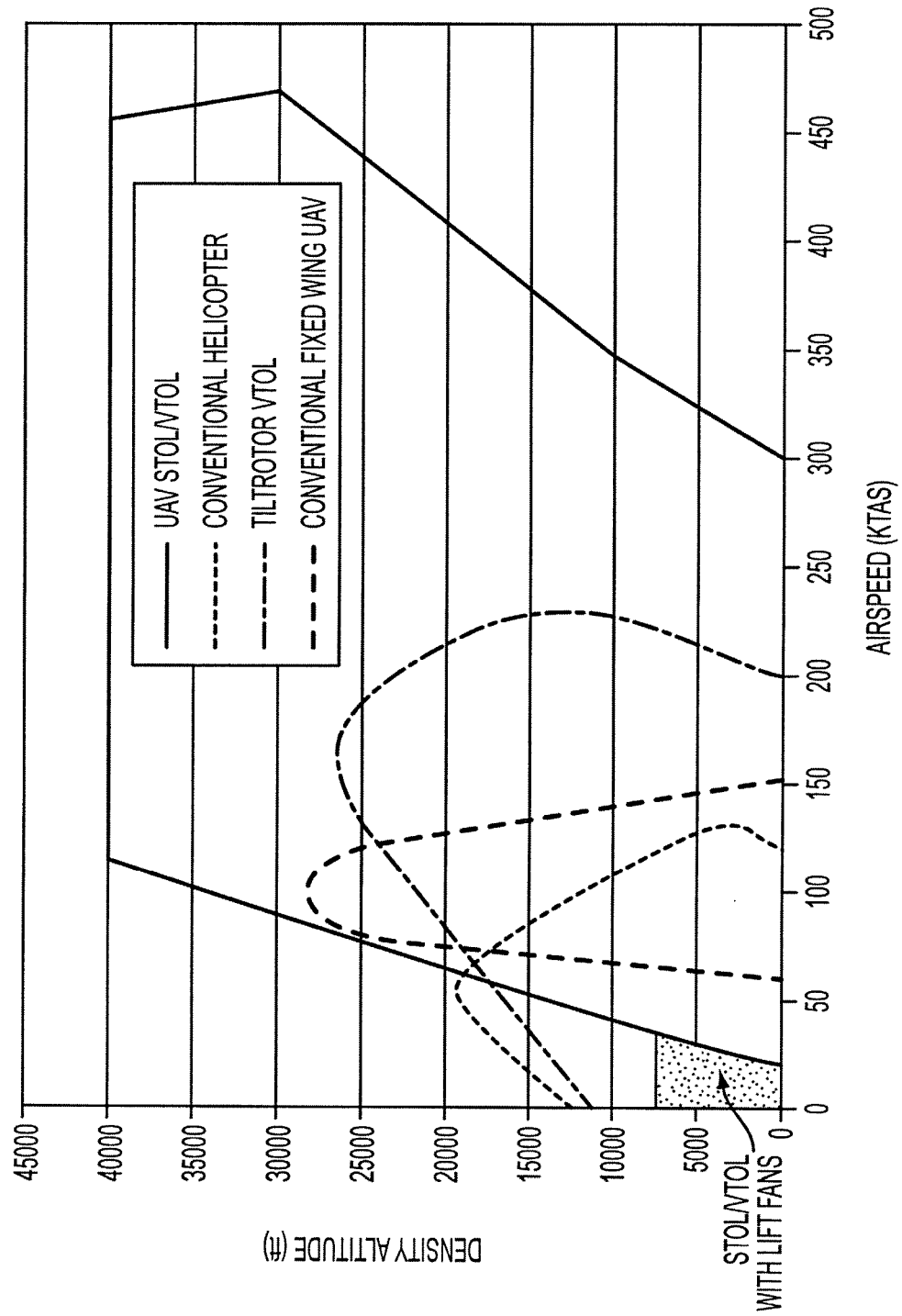
FIG. 13 illustrates a plot of density altitude versus air speed for the STOL/VTOL A/C shown in FIGS. 2, 8, and 9 and several other conventional STOL/VTOL A/C

FIG. 13 illustrates a plot of density altitude versus air speed for the STOL/VTOL A/C shown in FIGS. 2, 8, and 9 and several other conventional STOL/VTOL A/C. A STOL/VTOL A/C UAV as described herein according to the several embodiments of the present invention has significant advantages over other types of UAVs. Conventional helicopters, represented by line B, have significant ceiling and foreword airspeed limitations. A tiltrotor VTOL, its performance characteristics shown by line C, has better operating characteristics, but still cannot operate even close to the maximum ceiling of the STOL/VTOL A/C according to the embodiments of the present invention. And a conventional fixed wing UAV has the most limited range of operating capabilities, as it is limited in its lowest operating airspeed (about 55 knots), its maximum airspeed (about 150 knots), and its maximum operating ceiling (about 28,000 feet density altitude). Only a STOL/VTOL A/C UAV according to an embodiment of the present invention can operate from a hover, 0 knots IAS, to 450 knots IAS at 30,000 feet density altitude. Further, because it uses gas turbine engines, a STOL/VTOL A/C UAV according to an embodiment of the present invention can operate up to 40,000 feet density altitude and at about 430 knots IAS. This is a substantial improvement in terms of density altitude and airspeed over any of the conventional type STOL/VTOL aircraft.

The present invention has been described with reference to several exemplary embodiments. However, it will be readily apparent to those skilled in the art that it is possible to embody the invention in specific forms other than that of the exemplary embodiments described above. This may be done without departing from the spirit and scope of the invention. The exemplary embodiments are merely illustrative and should not be considered restrictive in any way. The scope of the invention is given by the appended claims, rather than the preceding description, and all variations and equivalents which fall within the range of the claims are intended to be embraced therein.

All United States patents and applications, foreign patents, and publications discussed above are hereby incorporated herein by reference in their entireties.

What is claimed is:

1. A vertical take-off and landing (VTOL) aircraft, comprising:
   a tiltable primary engine configured to produce thrust for forward flight and thrust for hovering, said tiltable primary engine being disposed on a center of gravity of said aircraft and vertically tiltable with respect to an aircraft center line;
   a plurality of electrically-driven fans arranged about a periphery of an airframe of the VTOL aircraft, said plurality of electrically-driven fans consisting of (i) a first fan disposed at a nose of the VTOL aircraft, (ii) a second fan disposed at a left wing tip of the VTOL aircraft, and (iii) a third fan disposed at a right wing tip of the VTOL aircraft, the second fan and the third fan each being disposed closer to a tip than a root of the respective wing, said plurality of electrically-driven fans being disposed equidistant from said aircraft center of gravity;
   wherein airflow provided by each of the electrically-driven fans is oriented substantially perpendicular to the fuselage of the VTOL aircraft for producing thrust for hovering;
   a thrust control circuit in communication with each of the plurality of electrically-driven fans,
   wherein the thrust control circuit is configured to independently control the thrust for hovering provided by each of the plurality of electrically-driven fans to alter a total thrust for hovering provided by the plurality of electrically-driven fans and to alter pitch and roll moments of the VTOL aircraft while hovering;
   a plurality of vanes located in a fan exhaust of each of the plurality of electrically-driven fans; and
   an attitude control circuit in communication with each of the plurality of vanes and the thrust control circuit,
   wherein the attitude control circuit is configured to independently control deflection of each of the plurality of vanes for re-directing the thrust for hovering provided by each of the plurality of electrically-driven fans to control a yaw moment of the VTOL aircraft while hovering.

2. The VTOL aircraft of claim 1, wherein the primary engine is configured to be tilted to a position substantially perpendicular to the fuselage of the VTOL aircraft to produce thrust for hovering.

3. The VTOL aircraft of claim 1, wherein a nozzle of the primary engine is configured to be re-directed to produce thrust for hovering.

4. The VTOL aircraft of claim 1, wherein each of the plurality of electrically-driven fans comprises an airflow area that is greater than the primary engine.

5. The VTOL aircraft of claim 1, wherein the plurality of electrically-driven fans are oriented such that the airflow provided by the plurality of electrically-driven fans prevents re-ingestion of exhaust from the primary engine into an air inlet of the primary engine.

6. The VTOL aircraft of claim 1, wherein the plurality of electrically-driven fans are oriented such that the airflow provided by the plurality of electrically-driven fans prevents high-speed exhaust from the primary engine from creating a low pressure region under the VTOL aircraft while the VTOL aircraft is grounded.

7. The VTOL aircraft of claim 1, wherein the thrust control circuit controls the thrust for hovering provided by each of the plurality of electrically-driven fans by varying a RPM of a respective electrically-driven fan.

8. The VTOL aircraft of claim 1, wherein the thrust control circuit controls the thrust for hovering provided by each of the plurality of electrically-driven fans by varying a fan rotor pitch of a respective electrically-driven fan.

9. The VTOL aircraft of claim 1, wherein the thrust control circuit controls the thrust for hovering provided by each of the plurality of electrically-driven fans by deflecting drag-producing flaps located in the fan exhaust of a respective electrically-driven fan.

10. The VTOL aircraft of claim 1, wherein the plurality of vanes are oriented with pivot axes substantially radial to a center of mass of the VTOL aircraft.

11. The VTOL aircraft of claim 1, wherein the plurality of vanes are oriented with pivot axes substantially parallel to the fuselage of the VTOL aircraft.

12. The VTOL aircraft of claim 1, wherein electricity for powering each of the plurality of electrically-driven fans is provided by an electrical generator powered by the primary engine.

13. The VTOL aircraft of claim 1, wherein the primary engine comprises a fuel-powered engine.

14. The VTOL aircraft of claim 13, wherein the fuel-powered engine comprises a turbo jet engine.

15. The VTOL aircraft of claim 13, wherein the fuel-powered engine comprises a turbo fan engine.

16. The VTOL aircraft of claim 1, wherein the plurality of electrically-driven fans comprises three electrically-driven fans.

17. The VTOL aircraft of claim 16, wherein the three electrically-driven fans are located at substantially equally-spaced angles about a center of the VTOL aircraft.

18. The VTOL aircraft of claim 1, wherein electricity for powering each of the plurality of electrically-driven fans is provided by an electricity storage unit associated with the plurality of electrically-driven fans.

19. The VTOL aircraft of claim 18, wherein the electricity storage unit comprises batteries.

20. A vertical take-off and landing aircraft, comprising:
a plurality of electrically-driven fans consisting of (i) a first electrically-driven fan disposed at a nose of the aircraft and configured to provide vertical downward thrust; (ii) a second electrically-driven fan disposed at an end of a left wing of the aircraft and configured to provide vertical downward thrust; and (iii) a third electrically-driven fan disposed at an end of a right wing of the aircraft and configured to provide vertical downward thrust; and
a tiltable internal-combustion engine disposed on a center of gravity of the aircraft and equidistant from said first, second, and third electrically-driven fans and configured to provide downward thrust and forward thrust, said tiltable internal-combustion engine being vertically tiltable in a plane passing through a central axis of the vertical take-off and landing aircraft.

21. A vertical take-off and landing aircraft according to claim 20, wherein said tiltable internal-combustion engine is disposed substantially at an aircraft center of gravity.

22. A vertical take-off and landing aircraft according to claim 20, wherein said engine comprises an internal combustion engine tiltable between a horizontal, forward-facing position, and a vertical upward-facing position.

23. A vertical take-off and landing aircraft according to claim 20, wherein said engine is disposed substantially centrally of said first, second, and third electrically-driven fans.

24. A vertical take-off and landing aircraft according to claim 20, further comprising, for each electrically-driven fan, a fan door configured to be open during hover and closed during horizontal flight.

25. A vertical take-off and landing aircraft according to claim 20, wherein said first, second, and third electrically-driven fans are mounted stationary.

26. A vertical take-off and landing aircraft according to claim 20 wherein each fan comprises a reversible fan.

27. A vertical take-off and landing aircraft according to claim 20, wherein each fan includes a controller.

28. A vertical take-off and landing aircraft according to claim 20, further comprising a flight control computer having an air volume control circuit configured to control a tilt angle of said tiltable internal-combustion engine.

29. A vertical take-off and landing aircraft according to claim 20, wherein the left and right wings are disposed with a negative dihedral angle.

30. A vertical take-off and landing aircraft according to claim 20, wherein the left and right wings are disposed with a zero dihedral angle.

31. A vertical take-off and landing aircraft according to claim 20, wherein said engine is tiltable about a substantially horizontal axis.

32. A vertical take-off and landing aircraft according to claim 31, wherein said horizontal axis is substantially perpendicular to a centerline of the aircraft.

33. A vertical take-off and landing aircraft according to claim 20, further comprising a left wing vane disposed on said left wing substantially adjacent said second electrically-driven fan, and a right wing vane disposed on said right wing substantially adjacent said third electrically-driven fan.

34. A vertical take-off and landing aircraft according to claim 33, further comprising a nose vane disposed on said nose substantially adjacent said first electrically-driven fan.

* * * * *